US012793906B2

(12) United States Patent
Hayashi et al.

(10) Patent No.: US 12,793,906 B2
(45) Date of Patent: Nov. 10, 2026

(54) EXTERIOR MATERIAL FOR ELECTRICAL STORAGE DEVICE, METHOD FOR MANUFACTURING SAME, AND ELECTRICAL STORAGE DEVICE

(71) Applicant: DAI NIPPON PRINTING CO., LTD., Tokyo (JP)

(72) Inventors: Shinji Hayashi, Tokyo (JP); Kenta Hiraki, Tokyo (JP); Daisuke Yasuda, Tokyo (JP); Masayasu Yamazaki, Tokyo (JP)

(73) Assignee: DAI NIPPON PRINTING CO., LTD., Tokyo (JP)

( * ) Notice: Subject to any disclaimer, the term of this patent is extended or adjusted under 35 U.S.C. 154(b) by 827 days.

(21) Appl. No.: 17/788,574

(22) PCT Filed: Dec. 25, 2020

(86) PCT No.: PCT/JP2020/048733
§ 371 (c)(1),
(2) Date: Jun. 23, 2022

(87) PCT Pub. No.: WO2021/132562
PCT Pub. Date: Jul. 1, 2021

(65) Prior Publication Data
US 2022/0375697 A1 Nov. 24, 2022

(30) Foreign Application Priority Data
Dec. 25, 2019 (JP) ................................ 2019-234058

(51) Int. Cl.
*H01G 11/78* (2013.01)
*C22C 21/02* (2006.01)
(Continued)

(52) U.S. Cl.
CPC ............ *H01G 11/78* (2013.01); *C22C 21/02* (2013.01); *H01M 50/10* (2021.01);
(Continued)

(58) Field of Classification Search
CPC ....... H01G 11/78; H01G 11/84; H01M 50/10; H01M 50/119; H01M 50/121;
(Continued)

(56) References Cited

U.S. PATENT DOCUMENTS

2008/0286635 A1 11/2008 Seino et al.
2015/0140397 A1* 5/2015 Tajima .................... B32B 27/08 429/127
(Continued)

FOREIGN PATENT DOCUMENTS

CN 109564993 A 4/2019
JP S61-110744 A 5/1986
(Continued)

OTHER PUBLICATIONS

"Kobelco, A5052 Technical Data Sheet, May 2013" (Year: 2013).*
(Continued)

*Primary Examiner* — Nicholas P D'Aniello
*Assistant Examiner* — Jesse J Efymow
(74) *Attorney, Agent, or Firm* — Oliff PLC

(57) ABSTRACT

An exterior material for an electrical storage device has a laminate including at least a base material layer, a barrier layer, and a thermosetting resin layer in this order, the barrier layer including an aluminum alloy foil that satisfies a composition of Si: 0.5 mass % or less, Fe: 0.2-2.0 mass % inclusive, and Mg: 0.1-5.0 mass % inclusive.

5 Claims, 3 Drawing Sheets

(51) Int. Cl.
*H01M 50/10* (2021.01)
*H01M 50/121* (2021.01)
*H01M 50/126* (2021.01)
*H01M 50/129* (2021.01)

(52) U.S. Cl.
CPC ....... *H01M 50/121* (2021.01); *H01M 50/126* (2021.01); *H01M 50/129* (2021.01)

(58) Field of Classification Search
CPC ............. H01M 50/129; H01M 50/126; H01M 2220/30; Y02E 60/10; Y02E 60/13
See application file for complete search history.

(56) References Cited

U.S. PATENT DOCUMENTS

| | | | | |
|---|---|---|---|---|
| 2016/0372719 | A1* | 12/2016 | Amano | H01G 11/78 |
| 2018/0260003 | A1* | 9/2018 | Honma | G06F 1/1698 |
| 2019/0198826 | A1 | 6/2019 | Yasuda et al. | |

FOREIGN PATENT DOCUMENTS

| | | | | |
|---|---|---|---|---|
| JP | H11-195404 | A | | 7/1999 |
| JP | 2005343105 | A | * | 12/2005 |
| JP | 2007-073402 | A | | 3/2007 |
| JP | 2008163357 | A | * | 7/2008 |
| JP | 2008-287971 | A | | 11/2008 |
| JP | 2015-165476 | A | | 9/2015 |
| JP | 2018-168449 | A | | 11/2018 |
| JP | 7205547 | B2 | * | 1/2023 |
| WO | 2017/188396 | A1 | | 11/2017 |
| WO | 2020/085189 | A1 | | 4/2020 |

OTHER PUBLICATIONS

"Hasegawa et al., JP-2005343105-A—MT, Dec. 15, 2005" (Year: 2005).*
"Hayashi et al., JP-7205547-B2—MT, Jan. 17, 2023" (Year: 2023).*
"ThyssenKrupp Materials, Aluminium Alloy 5005-H34 Material Data Sheet, 2016" (Year: 2016).*
"Zhao et al., JP-2008163357-A—MT, Jul. 17, 2008" (Year: 2008).*
"Pizhi et al., JP 2008-163357 A—Machine Translated, Jul. 17, 2008" (Year: 2008).*
Aug. 19, 2024 extended Search Report issued in European Patent Application No. 20907511.8.
Dec. 28, 2023 Office Action issued in Chinese Patent Application No. 202080089718.6.
Mar. 23, 2021 International Search Report issued in Patent Application No. PCT/JP2020/048733.

* cited by examiner

EXTERIOR MATERIAL FOR ELECTRICAL STORAGE DEVICE, METHOD FOR MANUFACTURING SAME, AND ELECTRICAL STORAGE DEVICE

TECHNICAL FIELD

The present disclosure relates to an exterior material for electrical storage devices, a method for manufacturing the exterior material for electrical storage devices, and an electrical storage device.

BACKGROUND ART

Various types of electrical storage devices have been developed heretofore, and in every electrical storage device, a packaging material (exterior material) is an essential member for sealing electrical storage device elements such as an electrode and an electrolyte. Metallic exterior materials have been often used heretofore as exterior materials for electrical storage devices.

On the other hand, in recent years, electrical storage devices have been required to be diversified in shape and to be thinned and lightened with improvement of performance of electric cars, hybrid electric cars, personal computers, cameras, mobile phones and so on. However, metallic exterior materials for electrical storage devices that have often been heretofore used have the disadvantage that it is difficult to keep up with diversification in shape, and there is a limit on weight reduction.

Thus, in recent years, a film-shaped exterior material with a base material layer, an aluminum alloy foil layer and a heat-sealable resin layer laminated in this order has been proposed as an exterior material for electrical storage devices which is easily processed into diversified shapes and is capable of achieving thickness reduction and weight reduction (see, for example, Patent Document 1).

In such a film-shaped exterior material, generally, a concave portion is formed by cold molding, electrical storage device elements such as an electrode and an electrolytic solution are disposed in a space formed by the concave portion, and heat-sealable resin layers are heat-sealed to each other to obtain an electrical storage device in which electrical storage device elements are stored in an exterior material.

PRIOR ART DOCUMENT

Patent Document

Patent Document 1: Japanese Patent Laid-open Publication No. 2008-287971

SUMMARY OF THE INVENTION

Problems to be Solved by the Invention

From the viewpoint of, for example, increasing the energy density of an electrical storage device, the film-shaped exterior material is required to have a deep concave portion formed by molding. Therefore, the aluminum alloy foil used for an exterior material for electrical storage devices is required to have high moldability.

As an aluminum alloy foil excellent in moldability, an Al—Fe alloy-based soft aluminum alloy foil is known. As specific examples of such a soft aluminum alloy foil, aluminum alloy foils are known which have a composition specified in JIS H4160: 1994 A8021H-O, a composition specified in JIS H4160: 1994 A8079H-O, a composition specified in JIS H4000: 2014 A8021P-O, or a composition specified in JIS H4000: 2014 A8079P-O.

On the other hand, in the step of molding an exterior material for electrical storage devices, the step of accommodating an electrical storage device element in an exterior material for electrical storage devices and performing heat-sealing, the step of bending a heat-sealed portion, and the like, an external terminal and an aluminum alloy foil of an exterior material for electrical storage devices may be short-circuited through contaminants, or the external terminal and the aluminum alloy foil of the exterior material for electrical storage devices may be short-circuited by getting close to each other or contacting each other due to pressure unevenness during heat-sealing, and if minute cracks or pinholes are generated in a heat-sealable resin layer located at an innermost layer, an electric current may pass between the aluminum alloy foil of the exterior material for electrical storage devices and the external terminal through an electrolytic solution penetrating the heat-sealable resin layer, resulting in corrosion of the aluminum alloy foil by alloying with lithium ions in the electrolytic solution (in particular, if the aluminum alloy foil and a negative electrode terminal are short-circuited through the electrolytic solution, the aluminum alloy foil is likely to corrode). If the aluminum alloy foil corrodes, a defect such as expansion of the aluminum alloy foil occurs, leading to deterioration of the performance of the electrical storage device.

Under these circumstances, an object of the present disclosure is to provide an exterior material for electrical storage devices in which at least a base material layer, a barrier layer including an aluminum alloy foil layer, and a heat-sealable resin layer are laminated in this order. The exterior material for electric storage devices is excellent in moldability, and effectively resists corrosion of the aluminum alloy foil if an electric current passes in a state where an electrolytic solution is deposited.

Means for Solving the Problem

The inventors of the present disclosure have extensively conducted studies for achieving the above-described object. Specifically, the present inventors have conducted studies on the composition of an aluminum alloy foil used for a barrier layer of an exterior material for electrical storage devices, and have found that when the contents of Si, Mg and Fe are set to be within predetermined ranges, the exterior material for electrical storage devices maintains high moldability and effectively resists corrosion if an electric current passes in a state where an electrolytic solution is deposited.

The present disclosure has been completed by further conducting studies on the basis the above-mentioned findings. That is, the present disclosure provides an invention of an aspect as described below.

An exterior material for electrical storage devices includes a laminate including at least a base material layer, a barrier layer and a heat-sealable resin layer in this order, the barrier layer including an aluminum alloy foil that satisfies a composition of Si: 0.5 mass % or less, Fe: 0.2 mass % or more and 2.0 mass % or less and Mg: 0.1 mass % or more and 5.0 mass % or less.

Advantages of the Invention

According to the present disclosure, it is possible to provide an exterior material for electrical storage devices in which at least a base material layer, a harrier layer including an aluminum alloy foil layer, and a heat-sealable resin layer are laminated in this order. The exterior material for electric storage devices is excellent in moldability, and effectively resists corrosion of the aluminum alloy foil if an electric current passes in a state where an electrolytic solution is deposited. According to the present disclosure, it is also possible to provide a method for manufacturing the exterior material for electrical storage devices, and an electrical storage device.

EMBODIMENTS OF THE INVENTION

Figure 1:
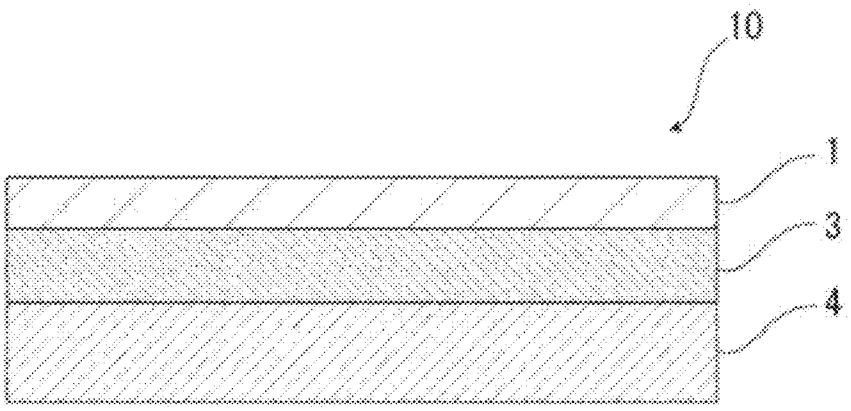
FIG. 1 is a schematic diagram showing an example of a cross-sectional structure of an exterior material for electrical storage devices according to the present disclosure.

The exterior material for electrical storage devices according to the present disclosure includes a laminate including at least a base material layer, a barrier layer and a heat-sealable resin layer in this order, the harrier layer including an aluminum alloy foil that satisfies a composition of Si: 0.5 mass % or less, Fe: 0.2 mass % or more and 2.0 mass % or less and Mg: 0.1 mass % or more and 5.0 mass % or less. Due to having such a configuration, the exterior material for electrical storage devices according to the present disclosure is excellent in moldability, and effectively resists corrosion of the aluminum alloy foil if an electric current passes in a state where an electrolytic solution is deposited.

Hereinafter, the exterior material for electrical storage devices according to the present disclosure, a method for manufacturing the exterior material for electrical storage devices, and an electrical storage device will be described in detail. In this specification, a numerical range indicated by the term "A to B" means "A or more" and "B or less". For example, the expression of "2 to 15 mm" means 2 mm or more and 15 mm or less.

1. Exterior Material for Electrical Storage Devices

As shown in, for example, FIGS. 1 to 4, an exterior material 10 for electrical storage devices according to the present disclosure includes a laminate including at least a base material layer 1, a barrier layer 3 and a heat-sealable resin layer 4 in this order. In the exterior material 10 for electrical storage devices, the base material layer 1 is on the outermost layer side, and the heat-sealable resin layer 4 is an innermost layer. In construction of the electrical storage device using the exterior material 10 for electrical storage devices and electrical storage device elements, the electrical storage device elements are put in a space formed by heat-sealing the peripheral portions of heat-sealable resin layers 4 of the exterior material 10 for electrical storage devices which face each other.

The barrier layer 3 of the exterior material for electrical storage devices according to the present disclosure includes an aluminum alloy foil. The harder layer 3 of the exterior material for electrical storage devices according to the present disclosure can be formed from an aluminum alloy foil. The exterior material for electrical storage devices according to the present disclosure which includes an aluminum alloy foil satisfying a predetermined composition described later is excellent in moldability, and effectively resists corrosion of the aluminum alloy foil.

Figure 2:
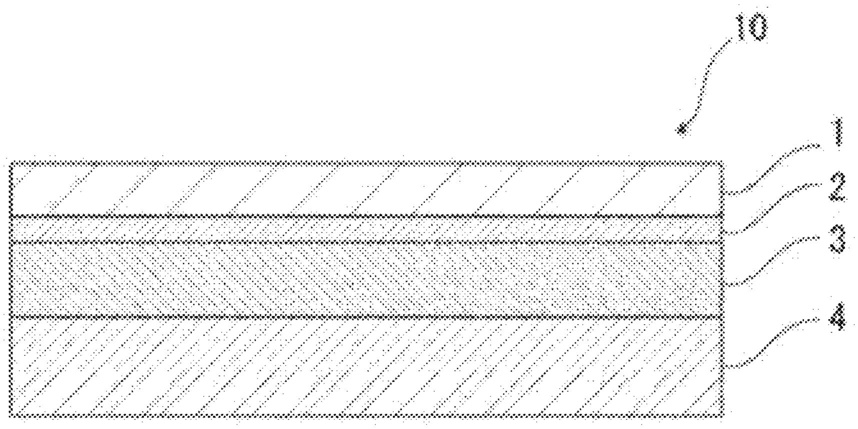
FIG. 2 is a schematic diagram showing an example of a cross-sectional structure of an exterior material for electrical storage devices according to the present disclosure.
Figure 3:
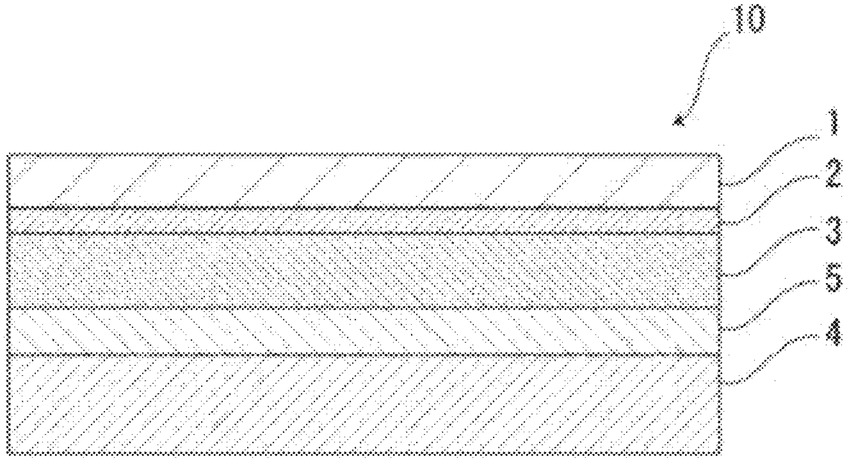
FIG. 3 is a schematic diagram showing an example of a cross-sectional structure of an exterior material for electrical storage devices according to the present disclosure.
Figure 4:
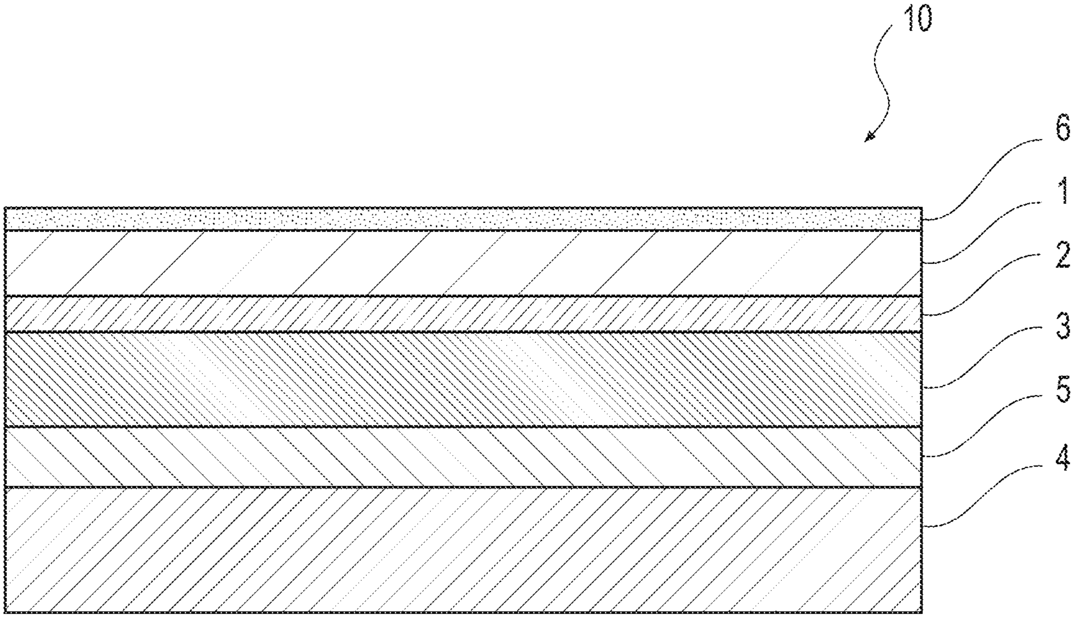
FIG. 4 is a schematic diagram showing an example of a cross-sectional structure of an exterior material tier electrical storage devices according to the present disclosure.

As shown in, for example, FIGS. 2 and 4, the exterior material 10 for electrical storage devices may have an adhesive agent layer 2 between the base material layer 1 and the harrier layer 3 if necessary for the purpose of, for example, improving bondability between these layers. As shown in, for example, FIGS. 3 and 4, an adhesive layer 5 may be present between the barrier layer 3 and the heat-sealable resin layer 4 if necessary for the purpose of, for example, improving bondability between these layers. As shown in FIG. 4, a surface coating layer 6 or the like may be provided on the outside of the base material layer 1 (on a side opposite to the heat-sealable resin layer 4 side) if necessary.

The thickness of the laminate forming the exterior material 10 for electrical storage devices is not particularly limited. The upper limit of the thickness of the laminate is, for example, 300 μm or less, preferably about 180 μm or less, or about 155 μm or less from the viewpoint of cost reduction, improvement of the energy density and the like, and the lower limit of the thickness of the laminate is preferably about 35 μm or more, about 45 μm or more, or about 60 μm or more from the viewpoint of maintaining the function of the exterior material for electrical storage devices of protecting a battery element. The thickness of the laminate is preferably in the range of, for example, about 35 to 180 μm, about 35 to 155 μm, about 35 to 120 μm, about 45 to 180 μm, about 45 to 155 μm, about 60 to 180 μm, or about 60 to 155 μm.

In the exterior material for electrical storage devices, Machine Direction (MD) and Transverse Direction (TD) in the process for manufacturing thereof can be discriminated from each other for the barrier layer 3 described later. For example, when the barrier layer 3 includes an aluminum alloy foil, linear streaks called rolling indentations are formed on the surface of the aluminum alloy foil in the rolling direction (RD: rolling direction) of the aluminum alloy foil. Since the rolling indentations extend along the rolling direction, the rolling direction of the aluminum alloy foil can be known by observing the surface of the aluminum alloy foil. In the process for manufacturing of the laminate, the MD of the laminate and the RD of the aluminum alloy foil normally coincides with each other, and therefore by observing the surface of the aluminum alloy foil of the laminate to identify the rolling direction (RD) of the aluminum foil, the MD of the laminate can be identified. Since the TD of the laminate is perpendicular to the MD of the laminate, the TD of the laminate can be identified.

Layers Forming Exterior Material for Electrical Storage Devices

Base Material Layer 1

In the present disclosure, the base material layer 1 is a layer provided for the purpose of, for example, exhibiting a function as a base material of the exterior material for electrical storage devices. The base material layer 1 is located on the outer layer side of the exterior material for electrical storage devices.

The material that forms the base material layer 1 is not particularly limited as long as it has a function as a base material, i.e. at least insulation quality. The base material layer 1 can be formed using, for example, a resin, and the resin may contain additives described later.

When the base material layer 1 is formed of a resin, the base material layer 1 may be, for example, a resin film formed of a resin, or may be formed by applying a resin. The resin film may be an unstretched film or a stretched film. Examples of the stretched film include uniaxially stretched films and biaxially stretched films, and biaxially stretched films are preferable. Examples of the stretching method for forming a biaxially stretched film include a sequential biaxial stretching method, an inflation method, and a simultaneous biaxial stretching method. Examples of the method for applying a resin include a roll coating method, a gravure coating method and an extrusion coating method.

Examples of the resin that forms the base material layer 1 include resins such as polyester, polyamide, polyolefin, epoxy resin, acrylic resin, fluororesin, polyurethane, silicone resin and phenol resin, and modified products of these resins. The resin that forms the base material layer 1 may be a copolymer of these resins or a modified product of the copolymer. Further, a mixture of these resins may be used.

Of these resins, polyester and polyamide are preferable as resins that form the base material layer 1.

Specific examples of the polyester resin include polyethylene terephthalate, polybutylene terephthalate, polyethylene naphthalate, polybutylene naphthalate, polyethylene isophthalate, and copolyesters. Examples of the copolyester include copolyesters having ethylene terephthalate as a main repeating unit. Specific examples thereof include copolymer polyesters that are polymerized with ethylene isophthalate and include ethylene terephthalate as a main repeating unit (hereinafter, abbreviated as follows after poly ethylene(terephthalate/isophthalate)), polyethylene(terephthalate/adipate), polyethylene(terephthalate/sodium sulfoisophthalate), polyethylene(terephthalate/sodium isophthalate), polyethylene (terephthalate/phenyl-dicarboxylate) and polyethylene (terephthalate/decane dicarboxylate). These polyesters may be used alone, or may be used in combination of two or more thereof.

Specific examples of the polyamide include polyamides such as aliphatic polyamides such as nylon 6, nylon 66, nylon 610, nylon 12, nylon 46, and copolymers of nylon 6 and nylon 66; hexamethylenediamine-isophthalic acid-terephthalic acid copolymerization polyamides containing a structural unit derived from terephthalic acid and/or isophthalic acid, such as nylon 6I, nylon 6T, nylon 6IT and nylon 6I6T (I denotes isophthalic acid and T denotes terephthalic acid), and polyamides containing aromatics, such as polyamide MXD6 (polymethaxylene adipamide); cycloaliphatic polyamides such as polyamide PACM6 (polybis(4-aminocyclohexyl)methaneadipamide; polyamides copolymerized with a lactam component or an isocyanate component such as 4,4'-diphenylmethane-diisocyanate, and polyester amide copolymers and polyether ester amide copolymers as copolymers of a copolymerization polyamide and a polyester or a polyalkylene ether glycol; and copolymers thereof. These polyamides may be used alone, or may be used in combination of two or more thereof.

The base material layer 1 contains preferably at least one of a polyester film, a polyamide film and a polyolefin film, preferably at least one of a stretched polyester film, a stretched polyamide film and a stretched polyolefin film, still more preferably at least one of a stretched polyethylene terephthalate film, a stretched polybutylene terephthalate film, a stretched nylon film and a stretched polypropylene film, even more preferably at least one of a biaxially stretched polyethylene terephthalate film, a biaxially stretched polybutylene terephthalate film, a biaxially stretched nylon film, and a biaxially stretched polypropylene film.

The base material layer 1 may be a single layer, or may include two or more layers. When the base material layer 1 includes two or more layers, the base material layer 1 may be a laminate obtained by laminating resin films with an adhesive or the like, or a resin film laminate obtained by co-extruding resins to form two or more layers. The resin film laminate obtained by co-extruding resins to form two or more layers may be used as the base material layer 1 in an unstretched state, or may be uniaxially stretched or biaxially stretched and used as the base material layer 1.

Specific examples of the resin film laminate with two or more layers in the base material layer 1 include laminates of a polyester film and a nylon film, nylon film laminates with two or more layers, and polyester film laminates with two or more layers. Laminates of a stretched nylon film and a stretched polyester film, stretched nylon film laminates with two or more layers, and stretched polyester film laminates with two or more layers are preferable. For example, when the base material layer 1 is a resin film laminate with two layers, the base material layer 1 is preferably a laminate of a polyester resin film and a polyester resin film, a laminate of a polyamide resin film and a polyamide resin film, or a laminate of a polyester resin film and a polyamide resin film, more preferably a laminate of a polyethylene terephthalate film and a polyethylene terephthalate film, a laminate of a nylon film and a nylon film, or a laminate of a polyethylene terephthalate film and a nylon film. Since the polyester resin is hardly discolored even in the case where for example, an electrolytic solution is deposited on the surface, it is preferable that the polyester resin film is located at the outermost layer of the base material layer 1 when the base material layer 1 is a resin film laminate with two or more layers.

When the base material layer 1 is a resin film laminate with two or more layers, the two or more resin films may be laminated with an adhesive interposed therebetween. Specific examples of the preferred adhesive include the same adhesives as those exemplified for the adhesive agent layer 2 described later. The method for laminating a resin film having two or more layers is not particularly limited, and a known method can be employed. Examples thereof include a dry lamination method, a sand lamination method, an extrusion lamination method and a thermal lamination method, and a dry lamination method is preferable. When the resin film is laminated by a dry lamination method, it is preferable to use a polyurethane adhesive as the adhesive. Here, the thickness of the adhesive is, for example, about 2 to 5 μm. In addition, the lamination may be performed with an anchor coat layer formed on the resin film. Examples of the anchor coat layer include the same adhesives as those exemplified for the adhesive agent layer 2 described later. Here, the thickness of the anchor coat layer is, for example, about 0.01 to 1.0 μm.

Additives such as a slipping agent, a flame retardant, an antiblocking agent, an antioxidant, a light stabilizer, a tackifier and an antistatic agent may be present on at least one of the surface of the base material layer 1 and/or inside the base material layer 1. The additives may be used alone, or may be used in combination of two or more thereof.

In the present disclosure, it is preferable that a slipping agent is present on the surface of the base material layer 1 from the viewpoint of enhancing the moldability of the exterior material for electrical storage devices. The slipping agent is not particularly limited, and is preferably an amide-based slipping agent. Specific examples of the amide-based slipping agent include saturated fatty acid amides, unsaturated fatty acid amides, substituted amides, methylol amides, saturated fatty acid bisamides, unsaturated fatty acid bisamides, fatty acid ester amides, and aromatic bisamides. Specific examples of the saturated fatty acid amide include lauric acid amide, palmitic acid amide, stearic acid amide, behenic acid amide, and hydroxystearic acid amide. Specific examples of unsaturated fatty acid amide include oleic acid amide and erucic acid amide. Specific examples of the substituted amide include N-oleylpalmitic acid amide, N-stearyl stearic acid amide, N-stearyl oleic acid amide, N-oleyl stearic acid amide, and N-stearyl erucic acid amide. Specific examples of the methylolamide include methylolstearic acid amide. Specific examples of the saturated fatty acid bisamide include methylenebisstearic acid amide, ethyl enebiscapric acid amide, ethylenehislauric acid amide, ethylenebisstearic acid amide, ethylenebishydroxystearic acid amide, ethylenebisbehenic acid amide, hexamethylenebisstearic acid amide, hexamethylenehydroxystearic acid amide, N,N'-distearyl adipic acid amide, and N,N'-distearyl sebacic acid amide. Specific examples of the unsaturated fatty acid bisamide include ethylenebisoleic acid amide, ethylenebiserucic acid amide, hexamethylenebisoleic acid amide, N,N'-dioleyladipic acid amide, and N,N'-dioleylsehacic acid amide. Specific examples of the fatty acid ester amide include stearoamideethyl stearate. Specific examples of the aromatic bisamide include m-xylylenebisstearic acid amide, m-xylylenebishydroxystearic acid amide, and N,N'-distearylisophthalic acid amide. The slipping agents may be used alone, or may be used in combination of two or more thereof.

When the slipping agent is present on the surface of the base material layer 1, the amount of the slipping agent present is not particularly limited, and is preferably about 3 $mg/m^2$ or more, more preferably about 4 to 15 $mg/m^2$, still more preferably about 5 to 14 $mg/m^2$.

The slipping agent present on the surface of the base material layer 1 may be one obtained by exuding the slipping agent contained in the resin forming the base material layer 1, or one obtained by applying the slipping agent to the surface of the base material layer 1.

The thickness of the base material layer 1 is not particularly limited as long as a function as a base material is performed, and the thickness of the base material layer 1 is, for example, about 3 to 50 μm, preferably about 10 to 35 μm. When the base material layer 1 is a resin film laminate with two or more layers, the thickness of the resin film forming each layer is preferably about 2 to 25 μm.

Adhesive Agent Layer 2

In the exterior material for electrical storage devices of the present disclosure, the adhesive agent layer 2 is a layer provided between the base material layer 1 and the barrier layer 3 if necessary for the purpose of enhancing bondability between these layers.

The adhesive agent layer 2 is formed from an adhesive capable of bonding the base material layer 1 and the barrier layer 3. The adhesive used for forming the adhesive agent layer 2 is not limited, and may be any of a chemical reaction type, a solvent volatilization type, a heat melting type, a heat pressing type, and the like. The adhesive agent may be a two-liquid curable adhesive (two-liquid adhesive), a one-liquid curable adhesive (one-liquid adhesive), or a resin that does not involve curing reaction. The adhesive agent layer 2 may be a single layer or a multi-layer.

Specific examples of the adhesive component contained in the adhesive include polyester such as polyethylene terephthalate, polybutylene terephthalate, polyethylene naphthalate, polybutylene naphthalate, polyethylene isophthalate and copolyester; polyether; polyurethane; epoxy resins; phenol resins; polyamides such as nylon 6, nylon 66, nylon 12 and copolymerized polyamide; polyolefin-based resins such as polyolefins, cyclic polyolefins, acid-modified polyolefins and acid-modified cyclic polyolefins; cellulose; (meth)acrylic resins; polyimide; polycarbonate; amino resins such as urea resins and melamine resins; rubbers such as chloroprene rubber, nitrile rubber and styrene-butadiene rubber; and silicone resins. These adhesive components may be used alone, or may be used in combination of two or more thereof. Of these adhesive components, polyurethane-based adhesives are preferable. In addition, the adhesive strength of these resins used as adhesive components can be increased by using an appropriate curing agent in combination. As the curing agent, appropriate one is selected from polyisocyanate, a polyfunctional epoxy resin, an oxazoline group-containing polymer, a polyamine resin, an acid anhydride and the like according to the functional group of the adhesive component.

Examples of the polyurethane adhesive include polyurethane adhesives containing a main agent containing a polyol compound and a curing agent containing an isocyanate compound. The polyurethane adhesive is preferably a two-liquid curable polyurethane adhesive having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound. Since the adhesive agent layer 2 is formed of a polyurethane adhesive, excellent electrolytic solution resistance is imparted to the exterior material for electrical storage devices, so that peeling of the base material layer 1 is suppressed even if the electrolytic solution is deposited on the side surface.

Other components may be added to the adhesive agent layer 2 as long as bondability is not inhibited, and the adhesive agent layer 2 may contain a colorant, a thermoplastic elastomer, a tackifier, a filler, and the like. When the adhesive agent layer 2 contains a colorant, the exterior material for electrical storage devices can be colored. As the colorant, known colorants such as pigments and dyes can be used. The colorants may be used alone, or may be used in combination of two or more thereof.

The type of pigment is not particularly limited as long as the bondability of the adhesive agent layer 2 is not impaired. Examples of the organic pigment include azo-based pigments, phthalocyanine-based pigments, quinacridone-based pigments, anthraquinone-based pigments, dioxazine-based pigments, indigothioindigo-based pigments, perinoneperylene-based pigments, isoindolenine-based pigments and benzimidazolone-based pigments. Examples of the inorganic pigment include carbon black-based pigments, titanium oxide-based pigments, cadmium-based pigments, lead-based pigments, chromium-based pigments and iron-based pigments, and also fine powder of mica (mica) and fish scale foil.

Of the colorants, carbon black is preferable for the purpose of, for example, blackening the appearance of the exterior material for electrical storage devices.

The average particle diameter of the pigment is not particularly limited, and is, for example, about 0.05 to 5 μm, preferably about 0.08 to 2 μm. The average particle size of the pigment is a median diameter measured by a laser diffraction/scattering particle size distribution measuring apparatus.

The content of the pigment in the adhesive agent layer 2 is not particularly limited as long as the exterior material for electrical storage devices is colored, and the content is, for example, about 5 to 60 mass %, preferably 10 to 40 mass %.

The thickness of the adhesive agent layer 2 is not particularly limited as long as the base material layer 1 and the barrier layer 3 can be bonded to each other, and for example, the thickness is about 1 μm or more, or about 2 μm or more for the lower limit, and about 10 μm or less, or about 5 μm or less for the upper limit, and is preferably in the range of about 1 to 10 μm, about 1 to 5 μm, about 2 to 10 μm, or about 2 to 5 μm.

Colored Layer

The colored layer is a layer provided between the base material layer 1 and the barrier layer 3 if necessary (not shown). When the adhesive agent layer 2 is present, the colored layer may be provided between the base material layer 1 and the adhesive agent layer 2 or between the adhesive agent layer 2 and the barrier layer 3. The colored layer may be provided outside the base material layer 1. By providing the colored layer, the exterior material for electrical storage devices can be colored.

The colored layer can be formed by, for example, applying an ink containing a colorant to the surface of the base material layer 1, the surface of the adhesive agent layer 2, or the surfaces of the barrier layer 3. As the colorant, known colorants such as pigments and dyes can be used. The colorants may be used alone, or may be used in combination of two or more thereof.

Specific examples of the colorant contained in the colored layer include the same colorants as those exemplified in the section [Adhesive Agent Layer 2].

Barrier Layer 3

In the exterior material for electrical storage devices, the barrier layer 3 is a layer which suppresses at least ingress of moisture.

The barrier layer 3 of the exterior material for electrical storage devices according to the present disclosure includes an aluminum alloy foil.

The aluminum alloy foil includes an aluminum alloy foil that satisfies the composition of Si (silicon): 0.50 mass % or less, Fe (iron): 0.2 mass % or more and 2.0 mass % or less and Mg (magnesium): 0.1 mass % or more and 5.0 mass % or less. The main component of the aluminum alloy foil is Al (aluminum), and aluminum constitutes, for example, 92.10 mass % or more of the aluminum alloy foil.

The aluminum alloy foil may contain components other than Si, Fe, Mg and Al. Examples of other components include inevitable impurities such as Mn (manganese), Cu (copper), Cr (chromium) and Zn (zinc). The total amount of inevitable impurities in the aluminum alloy foil are, for example, 0.40 mass % or less, with each inevitable impurity being contained at 0.10 mass % or less. There may be one type of component or two or more types of components as other components.

In the aluminum alloy foil, Fe is crystallized as an Al—Fe-based intermetallic compound during casting, and when the compound has a large size, Fe forms a site of recrystallization during annealing, so that there is an effect of refinement of recrystallized grains. If the content of Fe is less than the lower limit (0.2 mass %), the distribution density of large intermetallic compounds decreases, so that the effect of crystal grain refinement is low, and the final crystal grain size distribution becomes uneven. If the content of Fe is more than the upper limit (2.0 mass %), the effect of crystal grain refinement reaches a plateau or rather decreases, and further, the Al—Fe-based intermetallic compound produced during casting has a very large size, so that the elongation and the rolling property of the aluminum alloy foil are deteriorated. Thus, the content of Fe is set to be in the above-described range of 0.2 mass % or more and 2.0 mass % or less. For the same reason, the lower limit of the content of Fe is preferably 0.5 mass %, and for the same reason, it is more preferable that the lower limit of the content of Fe is 1.0 mass % and the upper limit of the content of Fe is 1.8 mass %.

In the aluminum alloy foil, Mg forms a solid solution with aluminum, and the strength of the aluminum alloy foil can be increased by solid solution intensification. In addition, Mg is likely to form a solid solution with aluminum, so that even when Mg is contained together with Fe, there is little risk that the intermetallic compound increases in size, leading to deterioration moldability and the rolling property. If the content of Mg is less than the lower limit (0.1 mass %), improvement of strength is insufficient, and if the content of Mg is more than the upper limit (5.0 mass %), the aluminum alloy foil hardens, leading to deterioration of the rolling property and moldability. The lower limit is particularly preferably 0.5 mass %. If the content of Mg is more than 5.0 mass %, it is possible to obtain an aluminum alloy foil having very high strength although the aluminum alloy foil hardens, leading to deterioration of moldability and the rolling property. It is desirable that the content of Mg be in the range of more than 0.5 mass % and 4.5 mass % or less. Addition of Mg improves corrosion resistance of the exterior material for electrical storage devices to an electrolytic solution. While details of the mechanism are not evident, an increase in added amount of Mg makes it harder for the aluminum alloy foil to react with lithium and the like in the electrolytic solution, so that it is possible to suppress micronization of the aluminum alloy foil and generation of through-holes.

In the aluminum alloy foil, a very small amount of Si may be added for the purpose of increasing the strength of the aluminum alloy foil, and in the present disclosure, addition of Si at more than 0.5 mass % increases the size of the Al—Fe—Si-based intermetallic compound generated during casting, resulting in deterioration of the elongation and the moldability of the aluminum alloy foil. Accordingly, if the aluminum alloy foil has a small thickness, breakage occurs with an intermetallic compound as an origination point, and the rolling property is deteriorated. In addition, if a large amount of Si is added to an alloy having a large Mg content, the amount of Mg—Si-based precipitates generated may increase, leading to deterioration of the rolling property, and reduction of strength due to a decrease of Mg in solid solution amount. For the same reason, it is desirable that the content of Si be 0.2 mass % or less. It is desirable that the lower limit value of the Si content be 0.001 mass %, and it is more desirable that the lower limit value of the Si content be 0.005 mass %. The moldability, rolling property, fineness of crystal grains and ductility tend to be better as the content of Si decrease.

The aluminum alloy foil can contain inevitable impurities such as Cu and Mn. It is desirable that the content of these impurities be, for example, 0.1 mass % or less. In the present disclosure, the upper limit of the content of the inevitable impurities is not limited to the above-described numerical value. However, Mn hardly forms a solid solution with aluminum, and therefore is different from Mg in that it cannot be expected that the strength of the aluminum alloy foil is significantly increased by solid solution intensification. In addition, large amount of Mn is added to an alloy having a large Fe content, the risk of increasing the size of the intermetallic compound and generating a large Al—Fe—Mn-based intermetallic compound may increase, leading to deterioration of the rolling property and moldability. Thus, it is desirable that the Mn content be 0.1 mass % or less. It is more desirable that the Mn content be 0.08 mass % or less. In addition, it is desirable that the lower limit value of the Mn content be 0.001 mass %, and it is more desirable that the lower limit value of the Mn content be 0.005 mass %.

According to the present disclosure, in the aluminum alloy foil, it is preferable to satisfy the composition of Mn (manganese): 0.1 mass % or less, it is more preferable to satisfy the composition of Mn (manganese): 0.01 mass % or more and 0.1 mass % or less, and it is still more preferable to satisfy the composition of Mn (manganese): 0.01 mass % or more and 0.08 mass % or less, from the viewpoint of obtaining an exterior material for electrical storage devices which is excellent in moldability and effectively resists corrosion if an electric current passes in a state where an electrolytic solution is deposited.

Examples of the preferred composition of the aluminum alloy foil include those satisfying the compositions of the following specific examples 1 and 2.

Specific Example 1

The content of Si is 0.1 mass % or more and 0.5 mass % or less, the content of Fe is 0.2 mass % or more and 2.0 mass % or less, the content of Ma is 0.1 mass % or more and 5.0 mass % or less, the content of Mn is 0.05 mass % or more and 0.1 mass % or less, the content of Cu is 0.0 mass % or more and 0.1 mass % or less, the content of Cr is 0.0 mass % or more and 0.1 mass % or less, the content of Zr is 0.0 mass % or more and 0.1 mass % or less, the content of each of other inevitable impurities is 0.05 mass % or less and the total content of the other inevitable impurities is 0.15 mass % or less, with the balance being Al.

Specific Example 2

It is more preferable that the content of Si is 0.1 mass % or more and 0.5 mass % or less, the content of Fe is 0.2 mass % or more and 2.0 mass % or less, the content of Mg is 0.1 mass % or more and 5.0 mass % or less, the content of Mn is 0.1 mass %, the content of Cu is 0.0 mass %, the content of Cr is 0.0 mass %, the content of Zr is 0.0 mass %, the content of each of other inevitable impurities is 0.05 mass % or less and the total content of the other inevitable impurities is 0.15 mass % or less, with the balance being Al. In the aluminum alloy foil, the content of Si is 0.5 mass % or less, the content of Fe is 0.2 mass % or more and 2.0 mass % or less, the content of Mg is 0.1 mass % or more and 5.0 mass % or less, the content of Mn is 0.1 mass %, the content of Cu is 0.0 mass %, the content of Cr is 0.0 mass %, the content of Zr is 0.0 mass %, the content of each of other inevitable impurities is 0.05 mass % or less and the total content of the other inevitable impurities is 0.15 mass % or less, with the balance being Al.

For dramatically improving shock resistance and piercing strength of existing aluminum alloy foils of JIS A 8079, JIS A 8021 and the like, it is desirable the tensile strength f the aluminum alloy foil be 100 MPa, or more, and it is more desirable that the tensile strength of the aluminum alloy foil be 200 MPa or more. It is desirable that the upper limit value of the tensile strength be 350 MPa. It is desirable that the upper limit value of the tensile strength be 200 MPa or more and 350 MPa or less, and it is more desirable that the upper limit value of the tensile strength be 200 MPa or more and 310 MPa or less. However, since moldability decreases as the tensile strength increases, it is better to suppress the tensile strength when moldability is considered to be important From the viewpoint of enhancing the moldability of the exterior material for electrical storage devices, it is preferable that the aluminum alloy foil has a tensile strength of 100 MPa or more and 180 MPa or less as measured for a JIS No. 5 test piece as specified in ITS Z 2241: 2011. Specifically, the tensile strength is measured by a method described in any of examples. The tensile strength of the aluminum alloy foil can be achieved by selecting the composition and optimizing the crystal grain size.

The effect of elongation on the moldability of the aluminum alloy foil significantly varies depending on the molding method, and moldability is not determined only by the elongation, in bulging of an exterior material using the aluminum alloy foil, the higher the elongation of the aluminum alloy foil, the more advantageous for molding. In the aluminum alloy foil, the elongation of measured for a JIS No. 5 test piece as specified in JIS Z 2241: 2011 is preferably 10% or more, more preferably 15% or more. It is desirable that the upper limit of the elongation be 40%, and it is more desirable that the upper limit of the elongation be 30%. In addition, it is desirable that the elongation be 0% or more and 40%, it is more desirable that the elongation be 15% or more and 40%, it is still more desirable that the elongation be 15% or more and 30%. Specifically, the tensile elongation is measured by a method described in any of examples. The elongation property of the aluminum alloy foil can be achieved by selecting the composition and reducing the crystal grain size.

The aluminum alloy foil satisfying the composition and properties described above can be manufactured by, for example, adjusting the composition on the basis on an aluminum alloy having any of compositions of alloy Nos. A 5000s of JIS H 4000: 2014, and passing through, for example, the steps of melting, homogenization treatment, hot rolling, cold rolling, intermediate annealing, cold rolling, and final annealing as a known method for manufacturing an aluminum alloy. For the conditions for manufacturing the aluminum alloy foil, it is possible to refer to, for example, Japanese Patent Laid-open No. 2005-163077. Each chemical component contained in the aluminum alloy foil is analyzed by an analysis test specified in JIS H 4160-1994.

An ingot of an aluminum alloy satisfying the composition of, for example, Si: 0.5 mass % or less, Fe: 0.2 mass % or more and 2.0 mass % or less and Mg: 0.1 mass % or more and 5.0 mass % or less is cast by a conventional method such as a semicontinuous method. The obtained laminate is subjected to homogenization treatment at 480 to 540° C. for 6 to 12 hours.

Generally, homogenization treatment of an aluminum material is performed at 400 to 600° C. for a long time (e.g. about 12 hours), and it is desirable to perform heat treatment at 480 to 540° C. for 6 hours or more with consideration given to crystal grain refinement by addition of Fe as in the present disclosure. If the temperature is lower than 480° C., grain refinement is insufficient, and if the temperature exceeds 540° C., the size of crystal grains increases. A treatment time of less than 6 hours leads to insufficient homogenization treatment.

After the homogenization treatment, hot rolling is performed to obtain an aluminum alloy sheet having a desired thickness. The hot rolling can be performed by a conventional method, and it is desirable that the winding temperature in the hot rolling be a temperature equal to or higher than the recrystallization temperature, specifically 300° C.' or higher. A temperature of lower than 300° C. is not desirable because a fine Al—Fe-based intermetallic compound of 0.3 μm or less is precipitated, and recrystallized grains and fiber grains are mixed after hot rolling, so that the crystal grain size after intermediate annealing or final annealing may be non-uniform, leading to deterioration of the elongation property.

After the hot rolling, cold rolling, intermediate annealing and final cold rolling are performed to set the thickness to 5 to 100 μm, thereby obtaining the aluminum alloy foil according to the present disclosure. It is desirable that the final cold rolling ratio be 90% or more.

The intermediate annealing in the middle of the cold rolling is not required to be performed, and may be performed in some cases. There are two types of intermediate annealing. One is batch annealing in which a coil is put into a furnace and held for a certain period of time, and the other is rapid heating and rapid cooling of a material by a continuous annealing line (hereinafter referred to as CAL annealing). When intermediate annealing is added, either of the methods may be used. CAL annealing is desirable when crystal grain refinement is performed to increase the strength, and batch annealing is preferable when priority is given to moldability.

For example, conditions of 300 to 400° C. for 3 hours or more can be adopted for batch annealing, and conditions of a temperature rise rate of 10 to 250'C./sec, a heating temperature of 400° C. to 550° C., no holding time or a holding time of 5 seconds or less, and a cooling rate of 20 to 200° C./sec can be adopted for CAL annealing. However, in the present disclosure, the presence or absence of intermediate annealing, the conditions for intermediate annealing when it is performed, and the like are not limited to specific ones.

After foil rolling, final annealing is performed to obtain a soft foil. The final annealing after foil rolling may be generally performed at 250° C. to 400° C. However, when the effect of corrosion resistance by Mg is further enhanced, it is desirable to perform holding at a high temperature of 350° C. or higher for 5 hours or more.

If the final annealing temperature is low, softening is insufficient, and the concentration of Mg on the foil surface may be insufficient, leading to deterioration of corrosion resistance. If the temperature exceeds 400° C., there is a possibility that Mg is excessively concentrated on the foil surface, so that the foil is discolored, or the properties of the oxide film change, and thus minute cracks are generated, leading to deterioration of corrosion resistance. A final annealing time of less than 5 hours leads to an insufficient effect of final annealing.

Figure 6:
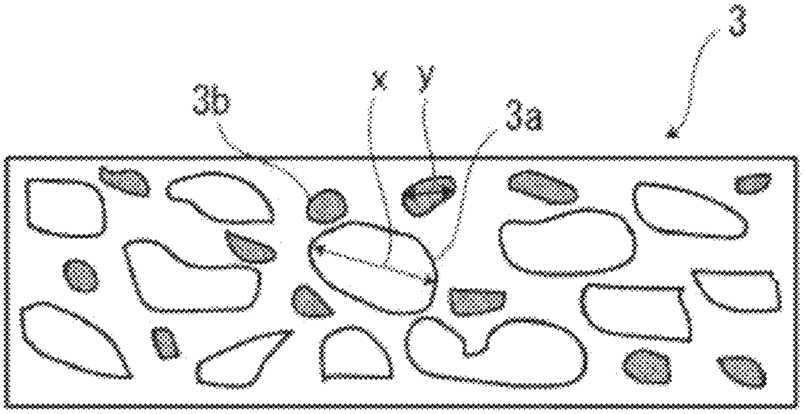
FIG. 6 is a schematic diagram showing crystal grains and second phase grains in a thickness-direction cross-section of an aluminum alloy foil.

In the present disclosure, where for randomly selected 100 second phase grains 3*b* within the visual field of an optical microscope, on a thickness-direction cross-section of the aluminum alloy foil (barrier layer 3), the straight-line distance between the leftmost end of each second phase grain 3*b* in a direction perpendicular to a thickness direction and the rightmost end of the second phase grain 3*b* in a direction perpendicular to the thickness direction is defined as a diameter y as shown in the schematic diagram of FIG. 6, the average of diameters y of top 20 second phase grains 3*b* having the largest diameters y is preferably 10.0 μm or less. Consequently, although the aluminum alloy foil is a very thin aluminum alloy foil having a thickness of, for example, about 85 μm or less, further about 50 μm or less, further about 40 μm or less, pinholes and cracks are hardly generated when the aluminum alloy foil is laminated on the exterior material for electrical storage devices, and molded, and excellent moldability can be imparted to the exterior material for electrical storage devices. Further, in the present disclosure, since the average of the diameters y of the second phase grains 3*b* in the aluminum alloy foil (barrier layer 3) is 10.0 μm or less, pinholes and cracks are hardly generated during molding and the exterior material for electrical storage devices has excellent moldability even when the thickness of the aluminum alloy foil is, for example, about 85 μm or less, further about 50 μm or less, further about 40 μm or less, and the total thickness of the exterior material for electrical storage devices is as small as, for example, the above-described thickness.

From the viewpoint of further enhancing moldability, the average of the diameters y is more preferably about 1.0 to 8.0 μm, still more preferably about 1.0~6.0 μm. Since FIG. 6 is a schematic diagram, the drawing is not fully shown, and the number of second phase grains 3*b* shown is less than 100.

In the present disclosure, the second phase grain contained in the aluminum alloy foil refers to an intermetallic compound grain present in the aluminum alloy, and is a crystallized phase divided by rolling or a precipitated phase grain precipitated when homogenizing treatment or annealing is performed.

When a thickness-direction cross-section of the aluminum alloy foil is observed with a scanning electron microscope (SEM), a crystal grain normally draws a boundary line at which it contacts a plurality of crystals. On the other hand, the second phase grain is a crystal with a single boundary line. In addition, the crystal grain and the second phase grain have different phases, and therefore have different colors on the SEM image. Further, when a thickness-direction cross-section of the aluminum alloy foil layer is observed with an optical microscope, the observation is easy because only the second phase grains look black due to a difference in phase between the crystal grains and the second phase grains.

From the viewpoint of further enhancing moldability, the average crystal grain diameter in the aluminum alloy foil is preferably 25.0 μm or less, more preferably 20.0 μm or less, still more preferably 10.0 μm or less, and is preferably 3.0 μm or more, more preferably 9.0 μm or more. The average crystal grain diameter is preferably in the range of about 1.0 to 25.0 μm, about 1.0 to 20.0 μm, about 1.0 to 10.0 μm, about 3.0 to 25.0 μm, about 3.0 to 20.0 μm, about 3.0 to 10.0 μm, about 9.0 to 25.0 μm, about 9.0 to 20.0 μm, about 9.0 to 10.0 μm. Since the average crystal grain diameter in the aluminum alloy foil is 25.0 μm or less and the diameter y of the second phase grain 3*b* is the above-described value, the moldability of the later-described exterior material for electrical storage devices can be further enhanced.

In the present disclosure, where a thickness-direction cross-section of the aluminum alloy foil is observed with a scanning electron microscope (SEM) is observed, and for 100 crystal grains 3*a* located within the visual field, the straight-line distance between the leftmost end of each crystal grain in a direction perpendicular to a thickness direction and the rightmost end of the crystal grain in a direction perpendicular to the thickness direction is defined as a maximum diameter x as shown in the schematic diagram of FIG. 6, the average crystal grain diameter in the aluminum alloy foil means an average value of the maximum diameters x of the 100 crystal grains. Since FIG. 6 is a schematic diagram, the drawing is not fully shown, and the number of crystal grains 3*a* shown is less than 100.

The thickness of the aluminum alloy foil may exhibit at least a function as a barrier layer for suppressing ingress of moisture in the exterior material for electrical storage devices. The lower limit and the upper limit of the thickness of the aluminum alloy foil are about 9 μm or more and about 200 μm or less, respectively. For example, from the viewpoint of reducing the thickness of the exterior material for electrical storage devices, the thickness of the aluminum alloy foil is preferably about 85 μm or less, more preferably about 50 μm or less, still more preferably about 45 μm or less, especially preferably about 40 μm or less for the upper limit, and preferably about 10 μm or more, more preferably about 20 μm or more, still more preferably about 25 μm or more for the lower limit, and is preferably in the range of about 10 to 85 μm, about 10 to 50 μm, about 10 to 45 μm, about 10 to 40 μm, about 20 to 85 μm, about 20 to 50 μm, about 20 to 45 μm, about 20 to 40 μm, about 25 to 85 μm, about 25 to 50 μm, about 25 to 45 μm, or about 25 to 40 μm.

In addition, for suppression of dissolution and corrosion of the aluminum alloy foil, and the like, it is preferable that a corrosion resistance film is provided on at least one surface of the aluminum alloy foil. The aluminum alloy foil may include a corrosion-resistant film on each of both surfaces. Here, the corrosion-resistant film refers to a thin film obtained by subjecting the surface of the aluminum alloy foil to, for example, hydrothermal denaturation treatment such as boehmite treatment, chemical conversion treatment, anodization treatment, plating treatment with nickel, chromium or the like, or corrosion prevention treatment by applying a coating agent to impart corrosion resistance to the aluminum alloy foil. One of treatments for forming the corrosion-resistant film may be performed, or two or more thereof may be performed in combination. In addition, not only one layer but also multiple layers can be formed. Further, of these treatments, the hydrothermal denaturation treatment and the anodization treatment are treatments in which the surface of the metal foil is dissolved with a treatment agent to form a metal compound excellent in corrosion resistance. The definition of the chemical conversion treatment may include these treatments. When the aluminum alloy foil is provided with the corrosion-resistant film, the aluminum alloy foil is regarded as including the corrosion-resistant film.

The corrosion-resistant film exhibits the effects of preventing delamination between the aluminum alloy foil and the base material layer during molding of the exterior material for electrical storage devices; preventing dissolution and corrosion of the surface of the aluminum alloy foil, dissolution and corrosion of aluminum oxide present on the surface of the aluminum alloy foil, by hydrogen fluoride generated by reaction of an electrolyte with moisture; improving the bondability (wettability) of the surface of the aluminum alloy foil; preventing delamination between the base material layer and the aluminum alloy foil during heat-sealing; and preventing delamination between the base material layer and the aluminum alloy foil during molding.

Various corrosion-resistant films formed by chemical conversion treatment are known, and examples thereof include mainly corrosion-resistant films containing at least one of a phosphate, a chromate, a fluoride, a triazine thiol compound, and a rare earth oxide. Examples of the chemical conversion treatment using a phosphate or a chromate include chromic acid chromate treatment, phosphoric acid chromate treatment, phosphoric acid-chromate treatment and chromate treatment, and examples of the chromium compound used in these treatments include chromium nitrate, chromium fluoride, chromium sulfate, chromium acetate, chromium oxalate, chromium biphosphate, acetylacetate chromate, chromium chloride and chromium potassium sulfate. Examples of the phosphorus compound used in these treatments include sodium phosphate, potassium phosphate, ammonium phosphate and polyphosphoric acid. Examples of the chromate treatment include etching chromate treatment, electrolytic chromate treatment and coating-type chromate treatment, and coating-type chromate treatment is preferable. This coating-type chromate treatment is treatment in which at least a surface of the barrier layer (e.g. an aluminum alloy foil) on the inner layer side is first degreased by a well-known treatment method such as an alkali immersion method, an electrolytic cleaning method, an acid cleaning method, an electrolytic acid cleaning method or an acid activation method, and a treatment solution containing a metal phosphate such as Cr (chromium) phosphate, Ti (titanium) phosphate, Zr (zirconium) phosphate or Zn (zinc) phosphate or a mixture of these metal salts as a main component, a treatment solution containing any of non-metal salts of phosphoric acid and a mixture of these non-metal salts as a main component, or a treatment solution formed of a mixture of any of these salts and a synthetic resin or the like is then applied to the degreased surface by a well-known coating method such as a roll coating method, a gravure printing method or an immersion method, and dried. As the treatment liquid, for example, various solvents such as water, an alcohol-based solvent, a hydrocarbon-based solvent, a ketone-based solvent, an ester-based solvent, and an ether-based solvent can be used, and water is preferable. Examples of the resin component used here include polymers such as phenol-based resins and acryl-based resins, and examples of the treatment include chromate treatment using an aminated phenol polymer having any of repeating units represented by the following general formulae (1) to (4). In the aminated phenol polymer, the repeating units represented by the following general formulae (1) to (4) may be contained alone, or may be contained in combination of two or more thereof. The acryl-based resin is preferably polyacrylic acid, an acrylic acid-methacrylic acid ester copolymer, an acrylic acid-maleic acid copolymer, an acrylic acid-styrene copolymer, or a derivative thereof such as a sodium salt, an ammonium salt or an amine salt thereof. In particular, a derivative of polyacrylic acid such as an ammonium salt, a sodium salt or an amine salt of polyacrylic acid is preferable. In the present disclosure, the polyacrylic acid means a polymer of acrylic acid. The acryl-based resin is also preferably a copolymer of acrylic acid and dicarboxylic acid or dicarboxylic anhydride, and is also preferably an ammonium salt, a sodium salt or an amine salt of a copolymer of acrylic acid and dicarboxylic acid or dicarboxylic anhydride. The acryl-based resins may be used alone, or may be used in combination of two or more thereof.

[Chemical Formula 1]

(1)

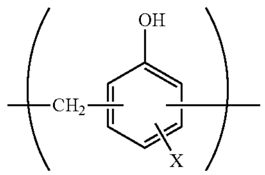

[Chemical Formula 2]

(2)

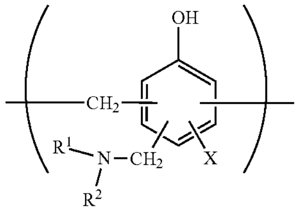

[Chemical Formula 3]

(3)

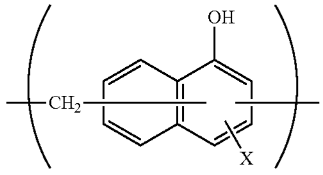

[Chemical Formula 4]

(4)

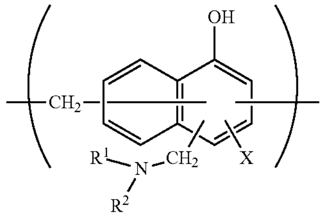

In the general formulae (1) to (4), X represents a hydrogen atom, a hydroxy group, an alkyl group, a hydroxyalkyl group, an allyl group, or a benzyl group. $R^1$ and $R^2$ are the same or different, and each represents a hydroxy group, an alkyl group, or a hydroxyalkyl group. In the general formulae (1) to (4), examples of the alkyl group represented by X, $R^1$ and $R^2$ include linear or branched alkyl groups with a carbon number of 1 to 4, such as a methyl group, an ethyl group, an n-propyl group, an isopropyl group, an n-butyl group, an isobutyl group, and a tort-butyl group. Examples of the hydroxyalkyl group represented by X, $R^1$ and $R^2$ include linear or branched alkyl groups a carbon number of 1 to 4, which is substituted with one hydroxy group, such as a hydroxymethyl group, a 1-hydroxyethyl group, a 2-hydroxyethyl group, a 1-hydroxypropyl group, a 2-hydroxypropyl group, a 3-hydroxypropyl group, a 1-hydroxybutyl group, a 2-hydroxybutyl group, a 3-hydroxybutyl group, and a 4-hydroxybutyl group. In the general formulae (1) to (4), the alkyl group and the hydroxyalkyl group represented by X, $R^1$ and $R^2$ may be the same or different. In the general formulae (1) to (4), X is preferably a hydrogen atom, a hydroxy group or a hydroxyalkyl group. A number average molecular weight of the aminated phenol polymer having repeating units represented by the general formulae (1) to (4) is preferably about 500 to 1,000,000, and more preferably about 1,000 to 20,000, for example. The aminated phenol polymer is produced by, for example, performing polycondensation of a phenol compound or a naphthol compound with formaldehyde to prepare a polymer including repeating units represented by the general formula (1) or the general formula (3), and then introducing a functional group ($—CH_2NR^1R^2$) into the obtained polymer using formaldehyde and an amine ($R^1R^2NH$). The aminated phenol polymers are used alone, or used in combination of two or more thereof.

Other examples of the corrosion-resistant film include thin films formed by corrosion prevention treatment of coating type in which a coating agent containing at least one selected from the group consisting of a rare earth element oxide sol, an anionic polymer and a cationic polymer is applied. The coating agent may further contain phosphoric acid or a phosphate, and a crosslinker for crosslinking the polymer. In the rare earth element oxide sol, fine particles of a rare earth element oxide (e.g. particles having an average particle diameter of 100 nm or less) are dispersed in a liquid dispersion medium. Examples of the rare earth element oxide include cerium oxide, yttrium oxide, neodymium oxide and lanthanum oxide, and cerium oxide is preferable from the viewpoint of further improving adhesion. The rare earth element oxides contained in the corrosion-resistant film can be used alone, or used in combination of two or more thereof. As the liquid dispersion medium for the rare earth element oxide, for example, various solvents such as water, an alcohol-based solvent, a hydrocarbon-based solvent, a ketone-based solvent, an ester-based solvent, and an ether-based solvent can be used, and water is preferable. For example, the cationic polymer is preferably polyethyleneimine, an ion polymer complex formed of a polymer having polyethyleneimine and a carboxylic acid, primary amine-grafted acrylic resins obtained by graft-polymerizing a primary amine with an acrylic main backbone, polyallylamine or a derivative thereof, or aminated phenol. The anionic polymer is preferably poly (meth)acrylic acid or a salt thereof, or a copolymer containing (meth)acrylic acid or a, salt thereof as a main component. The crosslinker is preferably at least one selected from the group consisting of a silane coupling agent and a compound having any of functional groups including an isocyanate group, a glycidyl group, a carboxyl group and an oxazoline group. In addition, the phosphoric acid or phosphate is preferably condensed phosphoric acid or a condensed phosphate.

Examples of the corrosion-resistant film include films formed by applying a dispersion of fine particles of a metal oxide such as aluminum oxide, titanium oxide, cerium oxide or tin oxide or barium sulfate in phosphoric acid to the surface of the barrier layer and performing baking treatment at 150° C. or higher.

The corrosion-resistant film may have a laminated structure in which at least one of a cationic polymer and an anionic polymer is further laminated if necessary. Examples of the cationic polymer and the anionic polymer include those described above.

The composition of the corrosion-resistant film can be analyzed by, for example, time-of-flight secondary ion mass spectrometry.

The amount of the corrosion-resistant film to be formed on the surface of the aluminum alloy foil in the chemical conversion treatment is not particularly limited, but for example when the coating-type chromate treatment is performed, and it is desirable that the chromic acid compound be contained in an amount of, for example, about 0.5 to 50 mg, preferably about 1.0 to 40 mg, in terms of chromium, the phosphorus compound be contained in an amount of, for example, about 0.5 to 50 mg, preferably about 1.0 to 40 mg, in terms of phosphorus, and the aminated phenol polymer be contained in an amount of, for example, about 1.0 to 200 mg, preferably about 5.0 to 150 mg, per 1 $m^2$ of the surface of the aluminum alloy foil.

The thickness of the corrosion-resistant film is not particularly limited, and is preferably about 1 nm to 20 μm, more preferably about 1 nm to 100 nm, still more preferably about 1 nm to 50 nm from the viewpoint of the cohesive force of the film and the adhesive strength with the barrier layer and the heat-sealable resin layer. The thickness of the corrosion-resistant film can be measured by observation with a transmission electron microscope or a combination of observation with a transmission electron microscope and energy dispersive X-ray spectroscopy or electron beam energy loss spectroscopy. By analyzing the composition of the corrosion-resistant film using time-of-flight secondary ion MSS spectrometry, peaks derived from secondary ions from, for example, Ce, P and O (e.g. at least one of $Ce_2PO_4^+$, $CePO_4^-$ and the like) and secondary ions from, for example, Cr, P and O (e.g. at least one of $CrPO_2^+$, $CrPO_4^-$ and the like) are detected.

The chemical conversion treatment is performed in the following manner: a solution containing a compound to be used for formation of a corrosion-resistant film is applied to the surface of the aluminum alloy foil by a bar coating method, a roll coating method, a gravure coating method, an immersion method or the like, and heating is then performed so that the temperature of the aluminum alloy foil is about 70 to about 200° C. The aluminum alloy foil may be subjected to a degreasing treatment by an alkali immersion method, an electrolytic cleaning method, an acid cleaning method, an electrolytic acid cleaning method or the like before the aluminum alloy foil is subjected to a chemical conversion treatment. When a degreasing treatment is performed as described above, the chemical conversion treatment of the surface of the aluminum alloy foil can be further efficiently performed. When an acid degreasing agent with a fluorine-containing compound dissolved in an inorganic acid is used for degreasing treatment, not only a metal foil degreasing effect can be obtained but also a metal fluoride can be formed as a passive state, and in this case, only degreasing treatment may be performed.

Heat-Sealable Resin Layer 4

In the exterior material for electrical storage devices of the present disclosure, the heat-sealable resin layer 4 is a layer (sealant layer) which corresponds to an innermost layer and performs a function of hermetically sealing the electrical storage device element by heat-sealing the heat-sealable resin layer during construction of the electrical storage device.

The resin forming the heat-sealable resin layer 4 is not particularly limited as long as it can be heat-sealed, a resin containing a polyolefin backbone such as a polyolefin or an acid-modified polyolefin is preferable. The resin forming the heat-sealable resin layer 4 can be confirmed to contain a polyolefin backbone by an analysis method such as infrared spectroscopy or gas chromatography-mass spectrometry. In addition, it is preferable that a peak derived from maleic anhydride is detected when the resin forming the heat-sealable resin layer 4 is analyzed by infrared spectroscopy. For example, when a maleic anhydride-modified polyolefin is measured by infrared spectroscopy, peaks derived from maleic anhydride are detected near wavenumbers of 1760 $cm^{-1}$ and 1780 $cm^{-1}$. When the heat-sealable resin layer 4 is a layer formed of a maleic anhydride-modified polyolefin, a peak derived from maleic anhydride is detected when measurement is performed by infrared spectroscopy. However, if the degree of acid modification is low, the peaks may be too small to be detected. In that case, the peaks can be analyzed by nuclear magnetic resonance spectroscopy.

Specific examples of the polyolefin include polyethylenes such as low-density polyethylene, medium-density polyethylene, high-density polyethylene and linear low-density polyethylene; ethylene-α-olefin copolymers; polypropylene such as homopolypropylene, block copolymers of polypropylene (e.g., block copolymers of propylene and ethylene) and random copolymers of polypropylene (e.g., random copolymers of propylene and ethylene); propylene-α-olefin copolymers; and terpolymers of ethylene-butene-propylene. Of these, polypropylene is preferable. The polyolefin resin in the case of a copolymer may be a block copolymer or a random copolymer. These polyolefin-based resins may be used alone, or may be used in combination of two or more thereof.

The polyolefin may be a cyclic polyolefin. The cyclic polyolefin is a copolymer of an olefin and a cyclic monomer, and examples of the olefin as a constituent monomer of the cyclic polyolefin include ethylene, propylene, 4-methyl-1-pentene, styrene, butadiene and isoprene. Examples of the cyclic monomer as a constituent monomer of the cyclic polyolefin include cyclic alkenes such as norbornene; cyclic dienes such as cyclopentadiene, dicyclopentadiene, cyclohexadiene and norbornadiene. Among these polyolefins, cyclic alkenes are preferable, and norbornene is more preferable.

The acid-modified polyolefin is a polymer with the polyolefin modified by subjecting the polyolefin to block polymerization or graft polymerization with an acid component. As the polyolefin to be acid-modified, the above-mentioned polyolefins, copolymers obtained by copolymerizing polar molecules such as acrylic acid or methacrylic acid with the above-mentioned polyolefins, polymers such as crosslinked polyolefins, or the like can also be used. Examples of the acid component to be used for acid modification include carboxylic acids such as maleic acid, acrylic acid, itaconic acid, crotonic acid, maleic anhydride and itaconic anhydride, and anhydrides thereof.

The acid-modified polyolefin may be an acid-modified cyclic polyolefin. The acid-modified cyclic polyolefin is a polymer obtained by copolymerizing a part of monomers firming the cyclic polyolefin in place of an acid component, or block-polymerizing or graft-polymerizing an acid component with the cyclic polyolefin. The cyclic polyolefin to be modified with an acid is the same as described above. The acid component to be used for acid modification is the same as the acid component used for modification of the polyolefin.

Examples of preferred acid-modified polyolefins include polyolefins modified with a carboxylic acid or an anhydride thereof, polypropylene modified with a carboxylic acid or an anhydride thereof, maleic anhydride-modified polyolefins, and maleic anhydride-modified polypropylene.

The heat-sealable resin layer 4 may be formed from one resin alone, or may be formed from a blend polymer obtained by combining two or more resins. Further, the heat-sealable resin layer 4 may be composed of only one layer, or may be composed of two or more layers with the same resin component or different resin components.

The heat-sealable resin layer 4 may contain a slipping agent etc. if necessary. When the heat-sealable resin layer 4 contains a slipping agent, the moldability of the exterior material for electrical storage devices can be improved. The slipping agent is not particularly limited, and a known slipping agent can be used. The slipping agents may be used alone, or may be used in combination of two or more thereof.

The slipping agent is not particularly limited, and is preferably an amide-based slipping agent. Specific examples of the slipping agent include those exemplified for the base material layer 1. The slipping agents may be used alone, or may be used in combination of two or more thereof.

When a slipping agent is present on the surface of the heat-sealable resin layer 4, the amount of the slipping agent present is not particularly limited, and is preferably about 10 to 50 mg/m$^2$, more preferably about 15 to 40 mg/m$^2$ from the viewpoint of improving the moldability of the exterior material for electrical storage devices.

The slipping agent present on the surface of the heat-sealable resin layer 4 may be one obtained by exuding the slipping agent contained in the resin forming the heat-sealable resin layer 4, or one obtained by applying a slipping agent to the surface of the heat-sealable resin layer 4.

The thickness of the heat-sealable resin layer 4 is not particularly limited as long as the heat-sealable resin layers are heat-sealed to each other to perform a function of sealing the electrical storage device element, and the thickness is, for example, about 100 μm or less, preferably about 85 μm or less, more preferably about 15 to 85 μm. For example, when the thickness of the adhesive layer 5 described later is 10 μm or more, the thickness of the heat-sealable resin layer 4 is preferably about 85 μm or less, more preferably about 15 to 45 μm. For example, when the thickness of the adhesive layer 5 described later is less than 10 μm or the adhesive layer 5 is not provided, the thickness of the heat-sealable resin layer 4 is preferably about 20 μm or more, more preferably about 35 to 85 μm.

Adhesive Layer 51

In the exterior material for electrical storage devices of the present disclosure, the adhesive layer 5 is a layer provided between the barrier layer 3 (or acid-resistant film) and the heat-sealable resin layer 4 if necessary for firmly bonding these layers to each other.

The adhesive layer 5 is formed from a resin capable of bonding the barrier layer 3 and the heat-sealable resin layer 4 to each other. The resin to be used for forming the adhesive layer 5 is, for example, the same as that of the adhesive exemplified for the adhesive agent layer 2. Preferably, the resin to be used for forming the adhesive layer 5 contains a polyolefin backbone. Examples thereof include the polyolefins and acid-modified polyolefins exemplified for the heat-sealable resin layer 4 described above. The resin forming the adhesive layer 5 can be confirmed to contain a polyolefin backbone by an analysis method such as infrared spectroscopy, gas chromatography-mass spectrometry, and the analysis method is not particularly limited. In addition, it is preferable that a peak derived from maleic anhydride is detected when the resin forming the adhesive layer 5 is analyzed by infrared spectroscopy. For example, when a maleic anhydride-modified polyolefin is measured by infrared spectroscopy, peaks derived from maleic anhydride are detected near wavenumbers of 1760 cm$^{-1}$ and 1780 cm$^{-1}$. However, if the degree of acid modification is low, the peaks may be too small to be detected. In that case, the peaks can be analyzed by nuclear magnetic resonance spectroscopy.

From the viewpoint of firmly bonding the barrier layer 3 and the heat-sealable resin layer 4 to each other, it is preferable that the adhesive layer 5 contains an acid-modified polyolefin. As the acid-modified polyolefin, polyolefins modified with a carboxylic acid or an anhydride thereof, polypropylene modified with a carboxylic acid or an anhydride thereof, maleic anhydride-modified polyolefins, and maleic anhydride-modified polypropylene is especially preferable.

Further, from the viewpoint of obtaining an exterior material for electrical storage devices excellent in shape stability after molding while decreasing the thickness of the exterior material for electrical storage devices, the adhesive layer 5 is more preferably a cured product of a resin composition containing an acid-modified polyolefin and a curing agent. Preferred examples of the acid-modified polyolefin include those described above.

The adhesive layer 5 is preferably a cured product of a resin composition containing an acid-modified polyolefin and at least one selected from the group consisting of a compound having an isocyanate group, a compound having an oxazoline group, and a compound having an epoxy group, especially preferably a cured product of a resin composition containing an acid-modified polyolefin and at least one selected from the group consisting of a compound having an isocyanate group and a compound having an epoxy group. Preferably, the adhesive layer 5 preferably contains at least one selected from the group consisting of polyurethane, polyester and epoxy resin. More preferably, the adhesive layer 5 contains polyurethane and epoxy resin. As the polyester, for example, an amide ester resin is preferable. The amide ester resin is generally produced by reaction of a carboxyl group with an oxazoline group. The adhesive layer 5 is more preferably a cured product of a resin composition containing at least one of these resins and the acid-modified polyolefin. When an unreacted substance of a curing agent, such as a compound having an isocyanate group, a compound having an oxazoline group, or an epoxy resin remains in the adhesive layer 5, the presence of the unreacted substance can be confirmed by, for example, a method selected from infrared spectroscopy, Raman spectroscopy, tittle-of-flight secondary ion mass spectrometry (TOF-SIMS) and the like.

From the viewpoint of further improving adhesion between the barrier layer 3 and the adhesive layer 5, the adhesive layer 5 is preferably a cured product of a resin composition containing a curing agent having at least one selected from the group consisting of an oxygen atom, a heterocyclic ring, a C═N bond, and a C—O—C bond. Examples of the curing agent having a heterocyclic ring include curing agents having an oxazoline group, and curing agents having an epoxy group. Examples of the curing agent having a C═N bond include curing agents having an oxazoline group and curing agents having an isocyanate group. Examples of the curing agent having a C—O—C bond include curing agents having an oxazoline group, curing agents having an epoxy group, and polyurethane. Whether the adhesive layer 5 is a cured product of a resin composition containing any of these curing agents can be confirmed by, for example, a method such as gas chromatography-mass spectrometry (GCMS), infrared spectroscopy (IR), time-of-flight secondary ion mass spectrometry (TOF-SIMS), or X-ray photoelectron spectroscopy (XPS).

The compound having an isocyanate group is not particularly limited, and is preferably a polyfunctional isocyanate compound from the viewpoint of effectively improving adhesion between the barrier layer 3 and the adhesive layer 5. The polyfunctional isocyanate compound is not particularly limited as long as it is a compound having two or more isocyanate groups. Specific examples of the polyfunctional isocyanate-based curing agent include pentane diisocyanate (PDI), isophorone diisocyanate (IPDI), hexamethylene diisocyanate (HDI), tolylene diisocyanate (TDI), diphenylmethane diisocyanate (MDI), polymerized or nurated products thereof, mixtures thereof, and copolymers of these compounds with other polymers. Examples thereof include adduct forms, biuret forms, and isocyanurate forms.

The content of the compound having an isocyanate group in the adhesive layer 5 is preferably in the range of 0.1 to 50 mass %, more preferably in the range of 0.5 to 40 mass % in the resin composition forming the adhesive layer 5. This enables effective improvement of adhesion between the harder layer 3 and the adhesive layer 5.

The compound having an oxazoline group is not particularly limited as long as it is a compound having an oxazoline backbone. Specific examples of the compound having an oxazoline group include compounds having a polystyrene main chain and compounds having an acrylic main chain. Examples of the commercially available product include EPOCROS series manufactured by Nippon Shokubai Co., Ltd.

The proportion of the compound having an oxazoline group in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

Examples of the compound having an epoxy group include epoxy resins. The epoxy resin is not particularly limited as long as it is a resin capable of forming a crosslinked structure by epoxy groups existing in the molecule, and a known epoxy resin can be used. The weight average molecular weight of the epoxy resin is preferably about 50 to 2,000, more preferably about 100 to 1,000, still more preferably about 200 to 800. In the first present disclosure, the weight average molecular weight of the epoxy resin is a value obtained by performing measurement by gel permeation chromatography (GPC) under the condition of using polystyrene as a standard sample.

Specific examples of the epoxy resin include glycidyl ether derivatives of trimethylolpropane, bisphenol A dialycidyl ether, modified bisphenol A diglycidyl ether, novolak glycidyl ether, glycerin polyglycidyl ether and polyglycerin polyglycidyl ether. The epoxy resins may be used alone, or may be used in combination of two or more thereof.

The proportion of the epoxy resin in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer 3 and the adhesive layer 5.

The polyurethane is not particularly limited, and a known polyurethane can be used. The adhesive layer 5 may be, for example, a cured product of two-liquid curable polyurethane.

The proportion of the polyurethane in the adhesive layer 5 is preferably in the range of 0.1 to 50 mass %, more preferably in the range of 0.5 to 40 mass % in the resin composition forming the adhesive layer 5. This enables effective improvement of adhesion between the barrier layer and the adhesive layer 5 in an atmosphere including a component which induces corrosion of the barrier layer, such as an electrolytic solution.

When the adhesive layer 5 is a cured product of a resin composition containing at least one selected from the group consisting of a compound having an isocyanate group, a compound having an oxazoline group and an epoxy resin, and the a d-modified polyolefin, the acid-modified polyolefin functions as a main agent, and the compound having an isocyanate group, the compound having an oxazoline group, and the compound having an epoxy group each function as a curing agent.

The thickness of the adhesive layer 5 is preferably about 50 μm or less, about 40 μm or less, about 30 μm or less, about 20 μm or less, or about 5 μm or less for the upper limit, and preferably about 0.1 μm or more or about 0.5 μm or more for the lower limit, and is preferably in the range of about 0.1 to 50 μm, about 0.1 to 40 μm, about 0.1 to 30 μm, about 0.1 to 20 μm, about 0.1 to 5 μm, about 0.5 to 50 μm, about 0.5 to 40 μm, about 0.5 to 30 μm, about 0.5 to 20 μm or about 0.5 to 5 μm. More specifically, the thickness is preferably about 1 to 10 μm, more preferably about 1 to 5 μm in the case of the adhesive exemplified for the adhesive agent layer 2 or a cured product of an acid-modified polyolefin with a curing agent. When any of the resins exemplified for the heat-sealable resin layer 4 is used, the thickness of the adhesive layer is preferably about 2 to 50 μm, more preferably about 10 to 40 μm. When the adhesive layer 5 is a cured product of a resin composition containing the adhesive exemplified for the adhesive agent layer 2 or an acid-modified polyolefin and a curing agent, the adhesive layer 5 can be formed by, for example, applying the resin composition and curing the resin composition by heating or the like. When the resin exemplified for the heat-sealable resin layer 4 is used, for example, extrusion molding of the heat-sealable resin layer 4 and the adhesive layer 5 can be performed.

Surface Coating Layer 6

The exterior material for electrical storage devices of the present disclosure may include a surface coating layer 6 on the base material layer 1 (on a side opposite to the barrier layer 3 from the base material layer 1) if necessary for the purpose of improving at least one of designability, electrolytic solution resistance, scratch resistance, moldability and the like. The surface coating layer 6 is a layer located on the outermost layer side of the exterior material for electrical storage devices when the power storage device is constructed using the exterior material for electrical storage devices.

The surface coating layer 6 can be formed from, for example, a resin such as polyvinylidene chloride, polyester, polyurethane, acrylic resin, or epoxy resin.

When the resin forming the surface coating layer 6 is a curable resin, the resin may be any of a one-liquid curable type and a two-liquid curable type, and is preferably a two-liquid curable type. Examples of the two-liquid curable resin include two-liquid curable polyurethane, two-liquid curable polyester and two-liquid curable epoxy resins. Of these, two-liquid curable polyurethane is preferable.

Examples of the two-liquid curable polyurethane include polyurethane which contains a main agent containing a polyol compound and a curing agent containing an isocyanate compound. The polyurethane is preferably two-liquid curable polyurethane having polyol such as polyester polyol, polyether polyol or acrylic polyol as a main agent, and aromatic or aliphatic polyisocyanate as a curing agent. Preferably, polyester polyol having a hydroxyl group in the side chain in addition to a hydroxyl group at the end of the repeating unit is used as the polyol compound. Since the surface coating layer 6 is formed of polyurethane, excellent electrolytic solution resistance is imparted to the exterior material for electrical storage devices.

If necessary, the surface coating layer 6 may contain additives such as the slipping agent, an anti-blocking agent, a matting agent, a flame retardant, an antioxidant, a tackifier and an anti-static agent on at least one of the surface and the inside of the surface coating layer 6 according to the functionality and the like to be imparted to the surface coating layer 6 and the surface thereof. The additives are in the form of, for example, fine particles having an average particle diameter of about 0.5 nm to 5 μm. The average particle diameter of the additives is a median diameter measured by a laser diffraction/scattering particle size distribution measuring apparatus.

The additives may be either inorganic substances or organic substances. The shape of the additive is not particularly limited, and examples thereof include a spherical shape, a fibrous shape, a plate shape, an amorphous shape and a scaly shape.

Specific examples of the additives include talc, silica, graphite, kaolin, montmorillonite, mica, hydrotalcite, silica gel, zeolite, aluminum hydroxide, magnesium hydroxide, zinc oxide, magnesium oxide, aluminum oxide, neodymium oxide, antimony oxide, titanium oxide, cerium oxide, calcium sulfate, barium sulfate, calcium carbonate, calcium silicate, lithium carbonate, calcium benzoate, calcium oxalate, magnesium stearate, alumina, carbon black, carbon nanotubes, high-melting-point nylons, acrylate resins, crosslinked acryl, crosslinked styrene, crosslinked polyethylene, benzoguanamine, gold, aluminum, copper and nickel. The additives may be used alone, or may be used in combination of two or more thereof. Of these additives, silica, barium sulfate and titanium oxide are preferable from the viewpoint of dispersion stability, costs, and so on. The surface of the additive may be subjected to various kinds of surface treatments such as insulation treatment and dispersibility enhancing treatment.

The method for forming the surface coating layer 6 is not particularly limited, and examples thereof include a method in which a resin for forming the surface coating layer 6 is applied. When the additive is added to the surface coating layer 6, a resin mixed with the additive may be applied.

The thickness of the surface coating layer 6 is not particularly limited as long as the above-mentioned function as the surface coating layer 6 is performed, and it is, for example, about 0.5 to 10 μm, preferably about 1 to 5 μm.

2. Method for Manufacturing Exterior Material for Electrical Storage Devices

The method for producing an exterior material for electrical storage devices is not particularly limited as long as a laminate is obtained in which the layers of the exterior material for electrical storage devices of the present disclosure are laminated. Examples thereof include a method including the step of laminating at least the base material layer 1, the barrier layer 3 and the heat-sealable resin 4 in this order. As described above, an aluminum alloy foil satisfying the predetermined composition described above can be used as the barrier layer 3.

An example of the method for producing the exterior material for electrical storage devices of the present disclosure is as follows. First, a laminate including the base material layer 1, the adhesive agent layer 2 and the barrier layer 3 in this order (hereinafter, the laminate may be described as a "laminate A") is formed. Specifically, the laminate A can be formed by a dry lamination method in which an adhesive to be used for formation of the adhesive agent layer 2 is applied onto the base material layer 1 or the barrier layer 3, the surface of which is subjected to a chemical conversion treatment if necessary, using a coating method such as a gravure coating method or a roll coating method, and dried, the barrier layer 3 or the base material layer 1 is then laminated, and the adhesive agent layer 2 is cured.

Then, the heat-sealable resin layer 4 is laminated on the barrier layer 3 of the laminate A. When the heat-sealable resin layer 4 is laminated directly on the barrier layer 3, the heat-sealable resin layer 4 may be laminated onto the barrier layer 3 of the laminate A by a method such as a thermal lamination method or an extrusion lamination method. When the adhesive layer 5 is provided between the barrier layer 3 and the heat-sealable resin layer 4, mention is made of, for example, (1) a method in which the adhesive layer 5 and the heat-sealable resin layer 4 are extruded to be laminated on the barrier layer 3 of the laminate A (extrusion lamination method or tandem lamination method); (2) a method in Which the adhesive layer 5 and the heat-sealable resin layer 4 are laminated to form a laminate separately, and the laminate is laminated on the barrier layer 3 of the laminate A by a thermal lamination method, or a method in which a laminate with the adhesive layer 5 laminated on the barrier layer 3 of the laminate A is formed, and laminated to the heat-sealable resin layer 4 by a thermal lamination method; (3) a method in which the melted adhesive layer 5 is poured between the barrier layer 3 of the laminate A and the heat-sealable resin layer 4 formed in a sheet shape beforehand, and simultaneously the laminate A and the heat-sealable resin layer 4 are bonded together with the adhesive layer 5 interposed therebetween (sandwich lamination); and (4) an adhesive for forming the adhesive layer 5 is applied by solution coating and dried or baked to laminate the adhesive on the barrier layer 3 of the laminate A, and the heat-sealable resin layer 4 formed in a sheet shape in advance is laminated on the adhesive layer 5.

When the surface coating layer 6 is provided, the surface coating layer 6 is laminated on a surface of the base material layer 1 on a side opposite to the barrier layer 3. The surface coating layer 6 can be formed by, for example, coating a surface of the base material layer 1 with the resin that forms the surface coating layer 6. The order of the step of laminating the barrier layer 3 on a surface of the base material layer 1 and the step of laminating the surface coating layer 6 on a surface of the base material layer 1 is not particularly limited. For example, the surface coating layer 6 may be formed on a surface of the base material layer 1, followed by forming the barrier layer 3 on a surface of the base material layer 1 on a side opposite to the surface coating layer 6.

As described above, a laminate including the surface coating layer 6 provided if necessary, the base material layer 1, the adhesive agent layer 2 provided if necessary, the barrier layer 3, the adhesive layer 5 provided if necessary, and the heat-sealable resin layer 4 in this order is formed, and the laminate may be further subjected to a heating treatment for strengthening the bondability of the adhesive agent layer 2 and the adhesive layer 5 provided if necessary.

In the exterior material for electrical storage devices, the layers forming the laminate may be subjected to surface activation treatment such as corona treatment, blast treatment, oxidation treatment or ozone treatment if necessary to improve processing suitability. For example, by subjecting a surface of the base material layer 1, which is opposite to the barrier layer 3, to a corona treatment, the ink printability of the surface of the base material layer 1 can be improved.

3. Uses of Exterior Material for Electrical Storage Devices

The exterior material for electrical storage devices of the present disclosure is used as a packaging for hermetically sealing and storing electrical storage device elements such as a positive electrode, a negative electrode and an electrolyte. That is, in a packaging formed of the exterior material for electrical storage devices, an electrical storage device element including at least a positive electrode, a negative electrode and an electrolyte can be stored to obtain a battery.

Specifically, an electrical storage device element including at least a positive electrode, a negative electrode and an electrolyte is covered with the exterior material for electrical storage devices of the present disclosure such that a flange portion (region where a heat-sealable resin layer is in contact with itself) can be formed on the periphery of the electrical storage device element while a metal terminal connected to each of the positive electrode and the negative electrode protrudes to the outside, and the heat-sealable resin layer at the flange portion is heat-sealed with itself, thereby providing an electrical storage device using the exterior material for electrical storage devices. When the electrical storage device element is stored in the packaging formed of the exterior material for electrical storage devices of the present disclosure, the packaging is formed in such a manner that the heat-sealable resin portion of the exterior material for electrical storage devices of the present disclosure is on the inner side (a surface contacting the electrical storage device element).

The exterior material for electrical storage devices according to the present disclosure can be suitably used for electrical storage devices such as batteries (including condensers, capacitors and the like.). The exterior material for electrical storage devices according to the present disclosure may be used for either primary batteries or secondary batteries, and is preferably used for secondary batteries. The type of a secondary battery to which the exterior material for electrical storage devices according to the present disclosure is applied is not particularly limited, and examples thereof include lithium ion batteries, lithium ion polymer batteries, solid-state batteries, lead storage batteries, nickel-hydrogen storage batteries, nickel-cadmium storage batteries, nickel-iron storage batteries, nickel-zinc storage batteries, silver oxide-zinc storage batteries, metal-air batteries, polyvalent cation batteries, condensers and capacitors. Of these secondary batteries, preferred subjects to which the exterior material for electrical storage devices according to the present disclosure is applied include lithium ion batteries and lithium ion polymer batteries.

EXAMPLES

Hereinafter, the present disclosure will be described in detail by way of examples and comparative examples. However, the present disclosure is not limited to examples.

Examples 1 to 20 and Comparative Examples 1 to 8

Manufacturing of Aluminum Alloy Foil

Ingots of aluminum alloys having compositions (balance represents Al and other unavoidable impurities) shown in Table 1 were provided, and each subjected to homogenization treatment under the conditions shown in Table 1, and then hot-rolled at a finish temperature of 330° C. to obtain a sheet material having a thickness of 3 mm. Thereafter, a sample of an aluminum alloy foil having a thickness of 40 μm and a width of 1200 mm was prepared by passing through cold rolling, intermediate annealing and final cold rolling. The intermediate annealing method is shown in Table 1. CAL annealing in Example 8 was performed under the conditions of a temperature rise rate of 40° C./sec, a heating temperature of 460° C., a holding time of 1 sec and a cooling rate of 40° C./sec. In the section of cold rolling in Table 1, a sheet thickness immediately before intermediate annealing and the cold rolling ratio up to the sheet thickness are shown.

The following tests or measurements were performed on the aluminum alloy foils produced in examples and comparative examples. Table 2 shows the results.

Tensile Strength and Elongation of Aluminum Alloy Foil

Both tensile strength and elongation were measured in a tensile test. The tensile test was conducted in accordance with JIS Z 2241: 2011 (based on ISO 6892-1), where a JIS No. 5 test piece was taken from a sample in such a manner that it was possible to measure the elongation in a direction at 0° with respect to the rolling direction, and subjected to the test at a tension rate of 2 mm/min using a universal tensile tester (AGS-X 10 kN manufactured by Shimadzu Corporation). The elongation percentage is calculated as follows. First, before the test, the center of the test piece in a longitudinal direction is marked with two lines along a longitudinal direction of the test piece at an interval of 50 mm as a gauge point distance. After the test, the broken surfaces of the aluminum alloy foil were matched with each other, the distance between the marks was measured, and the elongation amount (mm) obtained by subtracting the gauge point distance (50 mm) from the distance between the marks was divided by the gauge point distance (50 mm) to determine the elongation percentage (%). The elongation of the aluminum alloy foil is a total elongation at breakage (a sum of the elastic elongation and the plastic elongation in an extensometer), and is expressed as a percentage with respect to the extensometer gauge point distance.

Manufacturing of Exterior Material for Electrical Storage Devices

As a base material layer, a laminated film was prepared in which a polyethylene terephthalate film (12 μm), an adhesive agent layer (two-liquid curable urethane adhesive (polyol compound and aromatic isocyanate compound), thickness: 3 μm) and a biaxially stretched nylon film (thickness: 15 μm) were laminated in this order. Next, a barrier layer including the aluminum alloy foil (having a composition as in Table 1 and a thickness of 40 μm) with an acid-resistant film formed on both surfaces was laminated on a biaxially stretched nylon film (thickness: 15 μm) of the base material layer by a dry lamination method. Specifically, to one surface of the aluminum alloy foil with an acid-resistant film (film formed by chromate treatment and having a chrome content of 30 mg/$m^2$) formed on both surfaces, a two-liquid curable urethane adhesive (polyol compound and aromatic isocyanate compound) was applied to form an adhesive agent layer (thickness after curing: 3 μm) was formed on the aluminum alloy foil. The adhesive agent layer on the aluminum alloy foil and the biaxially stretched nylon film were then laminated, and aging treatment was then performed to prepare a laminate of base material layer/adhesive agent layer/barrier layer. Next, maleic anhydride-modified polypropylene (thickness: 40 μm) as an adhesive layer and polypropylene (thickness: 40 μm) as a heat-sealable resin layer were co-extruded onto the barrier layer of the obtained laminate to laminate an adhesive layer and a heat-sealable resin layer on the barrier layer. Next, the obtained laminate was aged and heated to obtain an exterior material for electrical storage devices in which a polyethylene terephthalate film (12 μm), an adhesive agent layer (3 μm), a biaxially stretched nylon film (15 μm), an adhesive agent layer (3 μm), a barrier layer (40 μm), an adhesive layer (40 μm) and a heat-sealable resin layer (40 μm) were laminated in this order.

On each of both surfaces of the exterior material for electrical storage devices, erucic acid amide was applied as a slipping agent to form a slipping agent layer.

Roughness Standard Specimen, Table 2; corner R: 2.0 mm; ridge line R: 1.0 mm) and a corresponding mold (male surface has a surface roughness in maximum height (nominal value of Rz) of 1.6 μm as specified in Appendix 1 (Reference) of JIS B 0659-1: 2002. Comparative Surface Roughness Standard Specimen, Table 2; corner R: 2.0 mm; ridge line R: 1.0 mm), the test sample was subjected to cold molding (draw molding in one stage) in an environment at 25° C. while the molding depth was changed by units of 0.5 mm from a molding depth of 0.5 mm under a pressing force (surface pressure) of 0.25 MPa. This procedure was carried out for 10 samples at each depth. At this time, the molding was performed with the test sample placed on the female mold so that the heat-sealable resin layer was located on the male mold side. The male mold and the female mold had a clearance of 0.3 mm. For the sample after cold molding, light was applied with a penlight in a dark room, and whether or not pinholes or cracks were generated in the aluminum alloy foil was checked on the basis of transmission of light. The deepest of depths at which none of the 10 samples had pinholes or cracks in the aluminum alloy foil was defined as a limit molding depth P mm. Samples having a limit molding depth of 4.0 mm or more were rated A, and samples having a limit molding depth of 3.0 mm or less were rated C. Table 2 shows the results.

TABLE 1

| | | Chemical component of aluminum alloy foil (mass %) | | | | | Conditions for manufacturing of aluminum alloy foil | | | | | | |
|---|---|---|---|---|---|---|---|---|---|---|---|---|---|
| | | | | | | | Homogenization treatment | | Cold rolling | | Intermediate annealing | | Final cold |
| | No. | Si | Fe | Mn | Mg | Al + Inevitable impurities | Temperature (° C.) | Time (h) | Sheet thickness (mm) | Cold rolling ratio (%) | Temperature (° C.) | Time (h) | rolling ratio (%) |
| Example | 1 | 0.14 | 1.2 | 0.04 | 0.20 | Balance | 530 | 10 | 0.7 | 76.7 | 360 | 5 | 94.3 |
| | 2 | 0.42 | 1.0 | 0.02 | 1.00 | Balance | 530 | 10 | 0.7 | 76.7 | 360 | 5 | 94.3 |
| | 3 | 0.22 | 0.6 | 0.01 | 1.20 | Balance | 530 | 10 | 0.7 | 76.7 | 360 | 5 | 94.3 |
| | 4 | 0.13 | 0.3 | 0.01 | 1.20 | Balance | 530 | 10 | 0.7 | 76.7 | 360 | 5 | 94.3 |
| | 5 | 0.12 | 1.7 | 0.02 | 1.20 | Balance | 530 | 10 | 0.7 | 76.7 | 360 | 5 | 94.3 |
| | 6 | 0.10 | 1.9 | 0.02 | 1.40 | Balance | 530 | 10 | 0.7 | 76.7 | 360 | 5 | 94.3 |
| | 7 | 0.15 | 1.5 | 0.08 | 1.20 | Balance | 530 | 10 | 0.7 | 76.7 | 360 | 5 | 94.3 |
| | 8 | 0.15 | 1.2 | 0.06 | 1.00 | Balance | 530 | 10 | 0.7 | 76.7 | CAL | | 94.3 |
| | 9 | 0.15 | 0.6 | 0.03 | 1.20 | Balance | 530 | 10 | 0.2 | 93.3 | 360 | 5 | 80.0 |
| | 10 | 0.14 | 1.2 | 0.04 | 0.20 | Balance | 530 | 10 | 0.2 | 93.3 | 360 | 5 | 80.0 |
| | 11 | 0.16 | 1.1 | 0.03 | 4.90 | Balance | 530 | 10 | 0.7 | 76.7 | 360 | 5 | 94.3 |
| | 12 | 0.43 | 1.1 | 0.04 | 2.50 | Balance | 530 | 10 | 0.7 | 76.7 | 360 | 5 | 94.3 |
| | 13 | 0.16 | 0.6 | 0.02 | 2.50 | Balance | 530 | 10 | 0.7 | 76.7 | 360 | 5 | 94.3 |
| | 14 | 0.14 | 0.3 | 0.02 | 2.50 | Balance | 530 | 10 | 0.7 | 76.7 | 360 | 5 | 94.3 |
| | 15 | 0.14 | 1.7 | 0.03 | 2.30 | Balance | 530 | 10 | 0.7 | 76.7 | 360 | 5 | 94.3 |
| | 16 | 0.11 | 1.9 | 0.04 | 2.20 | Balance | 530 | 10 | 0.7 | 76.7 | 360 | 5 | 94.3 |
| | 17 | 0.16 | 1.4 | 0.08 | 2.40 | Balance | 530 | 10 | 0.7 | 76.7 | 360 | 5 | 94.3 |
| | 18 | 0.15 | 1.3 | 0.05 | 2.50 | Balance | 530 | 10 | 0.7 | 76.7 | CAL | | 94.3 |
| | 19 | 0.15 | 0.7 | 0.05 | 2.00 | Balance | 530 | 10 | 0.2 | 93.3 | 360 | 5 | 80.0 |
| | 20 | 0.13 | 1.3 | 0.06 | 1.70 | Balance | 530 | 10 | 0.2 | 93.3 | 360 | 5 | 80.0 |
| Comparative Example | 1 | 0.65 | 1.2 | 0.02 | 1.50 | Balance | 530 | 10 | 0.7 | 76.7 | 360 | 5 | 94.3 |
| | 2 | 0.14 | 0.1 | 0.03 | 1.20 | Balance | 530 | 10 | 0.7 | 76.7 | 360 | 5 | 94.3 |
| | 3 | 0.16 | 2.3 | 0.04 | 1.20 | Balance | 530 | 10 | 0.7 | 76.7 | 360 | 5 | 94.3 |
| | 4 | 0.15 | 1.2 | 0.03 | 0.05 | Balance | 530 | 10 | 0.7 | 76.7 | 360 | 5 | 94.3 |
| | 5 | 0.64 | 1.2 | 0.03 | 2.50 | Balance | 530 | 10 | 0.7 | 76.7. | 360 | 5 | 94.3 |
| | 6 | 0.14 | 0.1 | 0.04 | 2.40 | Balance | 530 | 10 | 0.7 | 76.7 | 360 | 5 | 94.3 |
| | 7 | 0.16 | 2.2 | 0.04 | 2.50 | Balance | 530 | 10 | 0.7 | 76.7 | 360 | 5 | 94.3 |
| | 8 | 0.15 | 1.2 | 0.05 | 5.50 | Balance | 530 | 10 | 0.7 | 76.7 | 360 | 5 | 94.3 |

Evaluation of Moldability

Each of the thus-obtained exterior materials for electrical storage devices was cut to a rectangle having a length of 90 mm (MD) and a width of 150 mm (TD) to obtain a test sample. The MD of the exterior material for electrical storage devices corresponds to the rolling direction (RD) of the aluminum alloy foil, the TD of the exterior material for electrical storage devices corresponds to the TD of the aluminum alloy foil. Using a mold having a rectangular opening having a size of 31.6 mm (MD)×54.5 mm (TD) (female surface has a surface roughness in maximum height (nominal value of Rz) of 3.2 μm as specified in Appendix 1 (Reference) of JIS B 0659-1: 2002, Comparative Surface

Evaluation of Corrosion Resistance

Figure 5:
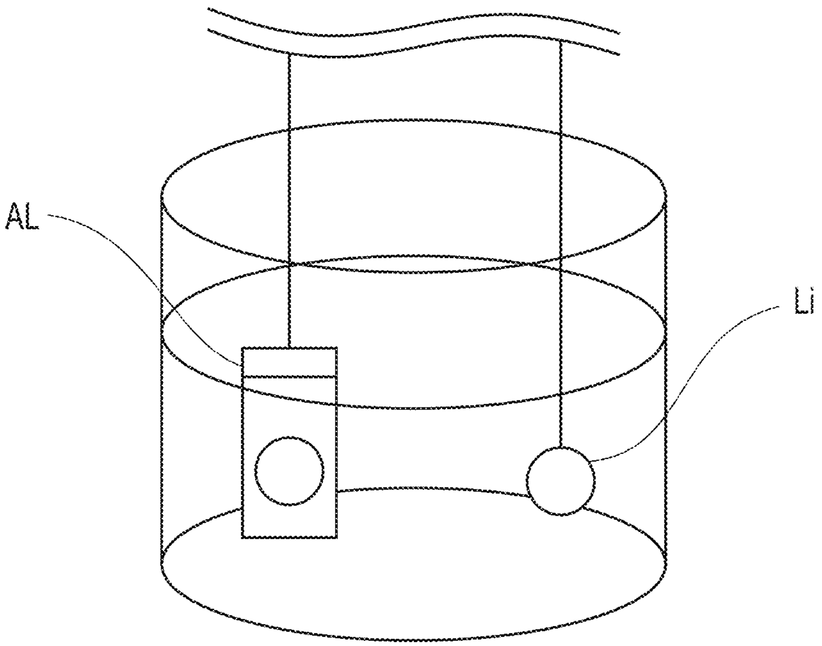
FIG. 5 is a schematic diagram for illustrating a method for evaluating corrosion resistance in an example.
Figure 7:
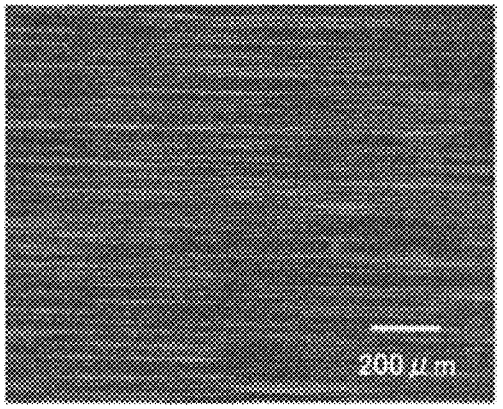
FIG. 7 is a microscope image of a surface of an aluminum alloy foil of Example 1 which is observed after evaluation of corrosion resistance.
Figure 8:
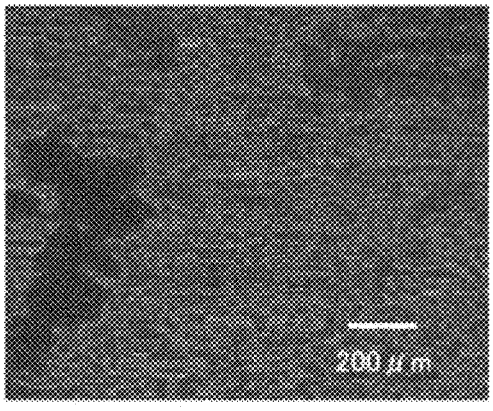
FIG. 8 is a microscope image of a surface of an aluminum alloy foil of Comparative Example 1 which is observed after evaluation of corrosion resistance.

Each of the aluminum alloy foils used in Examples 1 to 20 and Comparative Examples 1 to 8 was cut into a rectangle having a length of 45 mm and a width of 15 mm. Next, a rectangular polyethylene film having a length of 50 mm and a width of 20 mm was superposed on the front and back surfaces of the aluminum alloy foil so as to form an exposed portion of 1 cmφ on one of the front and back surfaces of the aluminum alloy foil, and attached by heat-welding to cover the aluminum alloy foil, thereby obtaining a test sample. The corrosion resistance of the test sample was evaluated at a portion of 1 cmφ where the aluminum alloy foil AL was exposed, and the end part of the test sample which was not immersed in an electrolytic solution was exposed to be connected to a working electrode. Next, as shown in the schematic diagram of FIG. 5, the test sample AL was set as a working electrode, and metallic lithium Li (disc shape of 15 mm in diameter and 0.35 mm in thickness) was set as a counter electrode, followed by immersion in an electrolytic solution (including $LiPF_6$ at 1 mol/l and a mixed liquid of ethylene carbonate, diethyl carbonate and dimethyl carbonate (volume ratio 1:1:1)). In this state, a voltage of 0.1 V was applied for 1 hour in an environment at 20° C., and a surface of the aluminum alloy foil was then observed. Samples whose surface corroded as in FIG. 8 (Comparative Example 1) were rated C, and samples whose surface had no change as in FIG. 7 (Example 1) were rated A. Table 2 shows the results. On a corroded aluminum alloy foil surface, a compound with lithium was generated, and a situation was observed in which the surface bulged due to volume expansion.

TABLE 2

| | No. | Aluminum alloy foil Elongation 0° | Tensile strength 0° | Exterior material for electrical storage devices Moldability | Corrosion resistance |
|---|---|---|---|---|---|
| Example | 1 | 18.9 | 112 | A | A |
| | 2 | 11.5 | 155 | A | A |
| | 3 | 14.1 | 164 | A | A |
| | 4 | 12.1 | 161 | A | A |
| | 5 | 15.3 | 166 | A | A |
| | 6 | 11.8 | 167 | A | A |
| | 7 | 14.1 | 169 | A | A |
| | 8 | 11.4 | 162 | A | A |
| | 9 | 11.9 | 161 | A | A |
| | 10 | 16.5 | 107 | A | A |
| | 11 | 22.3 | 310 | A | A |
| | 12 | 15.6 | 209 | A | A |
| | 13 | 16.8 | 214 | A | A |
| | 14 | 15.3 | 209 | A | A |
| | 15 | 17.9 | 211 | A | A |
| | 16 | 15.6 | 204 | A | A |
| | 17 | 17.0 | 222 | A | A |
| | 18 | 15.7 | 229 | A | A |
| | 19 | 15.3 | 200 | A | A |
| | 20 | 15.2 | 176 | A | A |
| Comparative Example | 1 | 8.9 | 176 | C | A |
| | 2 | 9.1 | 160 | C | A |
| | 3 | 8.0 | 166 | C | A |
| | 4 | 20.3 | 98 | A | C |
| | 5 | 13.7 | 195 | C | A |
| | 6 | 14.4 | 216 | C | A |
| | 7 | 11.5 | 199 | C | A |
| | 8 | 23.4 | 340 | C | C |

As is evident from the results shown in Tables 1 and 2, the exterior materials for electrical storage devices in Examples 1 to 20 include a laminate including at least a base material layer, a barrier layer, and a heat-sealable resin layer in this order, the barrier layer including an aluminum alloy foil that satisfies the composition of Si: 0.5 mass % or less, Fe: 0.2 mass % or more and 2.0 mass % or less, and Mg: 0.1 mass % or more and 5.0 mass %. The exterior materials for electrical storage devices in Examples 1 to 20 were excellent in moldability and corrosion resistance.

As described above, the present disclosure provides the invention of the following aspects.

Item 1. An exterior material for electrical storage devices including a laminate including at least a base material layer, a barrier layer and a heat-sealable resin layer in this order; the barrier layer including an aluminum alloy foil that satisfies a composition of Si: 0.5 mass % or less, Fe: 0.2 mass % or more and 2.0 mass % or less and Mg: 0.1 mass % or more and 5.0 mass % or less.

Item 2. The exterior material for electrical storage devices according to item 1, in which the composition of the aluminum alloy foil satisfies Mn: 0.1 mass % or less.

Item 3. The exterior material for electrical storage devices according to item 1 or 2, in which the aluminum alloy foil has a tensile strength of 100 MPa or more and an elongation of 10% or more as measured for a JIS No. 5 test piece as specified in JIS Z 2241: 2011.

Item 4. An electrical storage device in which an electrical storage device element including at least a positive electrode, a negative electrode and an electrolyte is stored in a packaging formed of the exterior material for electrical storage devices according to any one of items 1 to 3.

Item 5. A method for manufacturing an exterior material for electrical storage devices, the method including the step of laminating at least a base material layer, a barrier layer and a heat-sealable resin layer in this order to obtain a laminate, the barrier layer including an aluminum alloy foil that satisfies a composition of Si: 0.5 mass % or less, Fe: 0.2 mass % or more and 2.0 mass % or less and Mg: 0.1 mass % or more and 5.0 mass % or less.

DESCRIPTION OF REFERENCE SIGNS

1: Base material layer
2: Adhesive agent layer
3: Barrier layer
4: Heat-sealable resin layer
5: Adhesive layer
6: Surface coating layer
10: Exterior material for electrical storage devices

The invention claimed is:

1. An exterior material for electrical storage devices comprising a laminate including at least a base material layer, a barrier layer and a heat-sealable resin layer in this order, the barrier layer including an aluminum alloy foil that satisfies a composition of Si: 0.5 mass % or less, Fe: 0.7 mass % or more and 2.0 mass % or less, and Mg: 1.7 mass % or more and 5.0 mass % or less, and a tensile strength value of at least 176 MPa at 0°, wherein a total amount of Mn, Cu, Cr, Zn, and Zr in the aluminum alloy foil is 0.40 mass % or less, with each being less than 0.10 mass %.

2. The exterior material for electrical storage devices according to claim 1, wherein the aluminum alloy foil has a tensile strength of 100 MPa or more and an elongation of 10% or more as measured for a JIS No. 5 test piece as specified in JIS Z 2241:2011.

3. An electrical storage device in which an electrical storage device element including at least a positive electrode, a negative electrode and an electrolyte is stored in a packaging formed of the exterior material for electrical storage devices according to claim 1.

4. A method for manufacturing an exterior material for electrical storage devices, the method comprising the step of laminating at least a base material layer, a barrier layer and a heat-sealable resin layer in this order to obtain a laminate, the barrier layer including an aluminum alloy foil that satisfies a composition of Si: 0.5 mass % or less, Fe: 0.7 mass % or more and 2.0 mass % or less, and Mg: 1.7 mass % or more and 5.0 mass % or less, and a tensile strength value of at least 176 MPa at 0°, wherein a total amount of Mn, Cu, Cr, Zn, and Zr in the aluminum alloy foil is 0.40 mass % or less, with each being less than 0.10 mass %.

5. An electrical storage device in which an electrical storage device element including at least a positive electrode, a negative electrode and an electrolyte is stored in a packaging formed of the exterior material for electrical storage devices according to claim 2.

* * * * *